(12) United States Patent
Yoshimi et al.

(10) Patent No.: US 8,149,516 B2
(45) Date of Patent: Apr. 3, 2012

(54) ZOOM LENS WITH HIGH OPTICAL PERFORMANCE THROUGHOUT ENTIRE ZOOM RANGE AND IMAGE PICKUP APPARATUS HAVING THE SAME

(75) Inventors: Takahiro Yoshimi, Utsunomiya (JP); Youtarou Sanjou, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 157 days.

(21) Appl. No.: 12/787,080

(22) Filed: May 25, 2010

(65) Prior Publication Data

US 2010/0302649 A1 Dec. 2, 2010

(30) Foreign Application Priority Data

May 27, 2009 (JP) ................................. 2009-127523

(51) Int. Cl.
*G02B 15/14* (2006.01)
(52) U.S. Cl. ........ 359/686; 359/683; 359/684; 359/685; 359/687; 359/688; 359/714; 359/715; 359/740; 359/763; 359/764; 359/766; 359/772; 359/774; 359/775
(58) Field of Classification Search .......... 359/683–688, 359/714, 715, 740, 763, 764, 766, 772, 774, 359/775
See application file for complete search history.

(56) References Cited

U.S. PATENT DOCUMENTS

| | | | |
|---|---|---|---|
| 6,825,990 B2 | 11/2004 | Yoshimi et al. | |
| 7,079,324 B2 * | 7/2006 | Yamasaki | 359/680 |
| 7,193,789 B2 | 3/2007 | Maetaki | |
| 2008/0291545 A1 * | 11/2008 | Ishii | 359/684 |

FOREIGN PATENT DOCUMENTS

| | | |
|---|---|---|
| JP | 2004-109993 A | 4/2004 |
| JP | 2006-145823 A | 6/2006 |

* cited by examiner

*Primary Examiner* — Evelyn A. Lester
(74) *Attorney, Agent, or Firm* — Rossi, Kimms & McDowell LLP

(57) ABSTRACT

A zoom lens comprises, in order from an object side to an image side, a first lens unit having a positive refractive power, a second lens unit having a negative refractive power, a third lens unit, and a fourth lens unit having a positive refractive power. The fourth lens unit includes a forty-first lens unit having a negative refractive power and arranged at the object side with reference to the longest air gap and a forty-second lens unit having a positive refractive power and arranged at the image side with reference to the air gap. The forty-first lens unit includes a negative 411st lens, and the forty-second lens unit includes a positive 421st lens. Abbe numbers and partial dispersion ratios of materials of the 411st lens and the 421st lens $vd_{411}$, $\theta gF_{411}$, $vd_{421}$ and $\theta gF_{421}$ are appropriately set.

14 Claims, 21 Drawing Sheets

ZOOM LENS WITH HIGH OPTICAL PERFORMANCE THROUGHOUT ENTIRE ZOOM RANGE AND IMAGE PICKUP APPARATUS HAVING THE SAME

BACKGROUND OF THE INVENTION

1. Field of the Invention

The present invention relates to a zoom lens and an image pickup apparatus having the same, and is preferably applied to a broadcasting TV camera, a video camera, a digital still camera, a silver salt film camera, or the like.

2. Description of the Related Art

Recently, for an image pickup apparatus such as a TV camera, a silver salt film camera, a digital still camera, a video camera, or the like, a zoom lens having a high zoom ratio and a high optical performance is desired. As a zoom lens with a high zoom ratio, a four-group zoom lens of a positive lead type and a telephoto type in which a lens unit having a positive refractive power is arranged at the most object side and is constituted by four lens units as a whole is known. For example, a four-unit zoom lens which is constituted by a first lens unit having a positive refractive power for a focus operation, a second lens unit having a negative refractive power for a magnification varying operation, a third lens unit having a positive or negative refractive power for correcting an image plane displacement, and a fourth lens unit having a positive refractive power for forming an image is known. In such four-group zoom lenses, a four-group zoom lens having a high optical performance, which includes an optical material having an abnormal dispersibility is used to well correct a chromatic aberration is known (Japanese Patent Laid-open No. 2006-145823 and Japanese Patent Laid-open No. 2004-109993).

The zoom ratio of the four-group zoom lens of the positive lead type having the configuration described above is comparatively easily heightened. In order to obtain a high optical performance in the four-group zoom lens, it is important to well correct a chromatic aberration of magnification at a wide-angle end and an on-axis chromatic aberration at a telephoto end. If an optical material having an abnormal dispersibility is used, it is easy to well correct the chromatic aberration of magnification or the on-axis chromatic aberration. However, if a region (a lens) which appropriately absorbs the influence on other aberrations is not provided in this case, the correction balance of the chromatic aberration is deteriorated.

Commonly, at the image plane side with reference to a position of a stop, the height of incident light of an on-axis light beam on a lens surface is the maximum at the wide-angle end. Therefore, if a lens constituted by an optical material having an abnormal dispersibility is used at the image plane side with reference to the position of the stop, the influence is given to the on-axis chromatic aberration as well as the chromatic aberration of magnification. Therefore, it is difficult to correct both of them in a balanced manner. Accordingly, in a zoom lens which is bright and has a high zoom ratio, it is important to ensure a correction effect of the chromatic aberration of magnification and appropriately corrects the on-axis chromatic aberration to correct them in a balanced manner. Particularly, in the four-group zoom lens of the positive lead type, an appropriate setting of the lens configuration of the fourth lens unit which does not move for a zoom operation is an important factor in order to obtain a high optical performance over the entire zoom range. If the lens configuration of the fourth lens unit is inappropriate, various kinds of aberrations including the chromatic aberration are increased, and therefore it is difficult to obtain the high optical performance throughout the entire zoom range.

BRIEF SUMMARY OF THE INVENTION

The present invention provides a zoom lens which well corrects a chromatic aberration over an entire zoom range from a wide-angle end to a telephoto end with a high zoom ratio and has a high optical performance throughout the entire zoom range and an image pickup apparatus having the zoom lens.

A zoom lens of the present invention comprises, in order from an object side to an image side, a first lens unit which has a positive refractive power and does not move for a zoom operation, a second lens unit which has a negative refractive power and moves in the zoom operation, a third lens unit which moves in the zoom operation, and a fourth lens unit which has a positive refractive power and does not move for the zoom operation. The fourth lens unit is constituted by a forty-first lens unit which has a negative refractive power and is arranged at the object side with reference to the longest air gap and a forty-second lens unit which has a positive refractive power and is arranged at the image side with reference to the air gap. The forty-first lens unit includes a negative 411st lens and the forty-second lens unit includes a positive 421st lens. The following conditional expressions are satisfied, where $vd_{411}$ and $\theta gF_{411}$ are Abbe number and a partial dispersion ratio of a material of the 411st lens respectively, and $vd_{421}$ and $\theta gF_{421}$ are Abbe number and a partial dispersion ratio of a material of the 421st lens respectively.

$$-2.100\times10^{-3}\times vd_{411}+0.693<\theta gF_{411}$$

$$-2.100\times10^{-3}\times vd_{421}+0.693<\theta gF_{421}$$

$$0.555<\theta gF_{411}<0.900$$

$$0.555<\theta gF_{421}<0.900$$

Further features and aspects of the present invention will become apparent from the following description of exemplary embodiments with reference to the attached drawings.

DETAILED DESCRIPTION OF THE PREFERRED EMBODIMENTS

Exemplary embodiments of the present invention will be described below with reference to the accompanied drawings. A zoom lens of the present invention includes, in order from an object side to an image side, first to fourth lens units U1 to U4. The first lens unit U1 including a focus lens has a positive refractive power and does not move to perform a zoom operation. The second lens unit U2 has a negative refractive power and moves to the image side for a magnification varying operation in zooming from a wide-angle end (a short focal length end) to a telephoto end (a long focal length end). The third lens unit U3 moves on an optical path in conjunction with the movement of the second lens unit U2 and has a positive refractive power (or has a negative refractive power) to correct an image plane displacement caused by the magnification varying operation. The fourth lens unit U4 has a positive refractive power for an imaging function and does not move for the zoom operation. The zoom lens forms an image of the object on an image pickup element such as a photoelectric conversion element. The fourth lens unit includes a forty-first lens unit having a negative refractive power and a forty-second lens unit having a positive lens unit arranged at positions opposite to each other with reference to the longest air gap.

Figure 1:
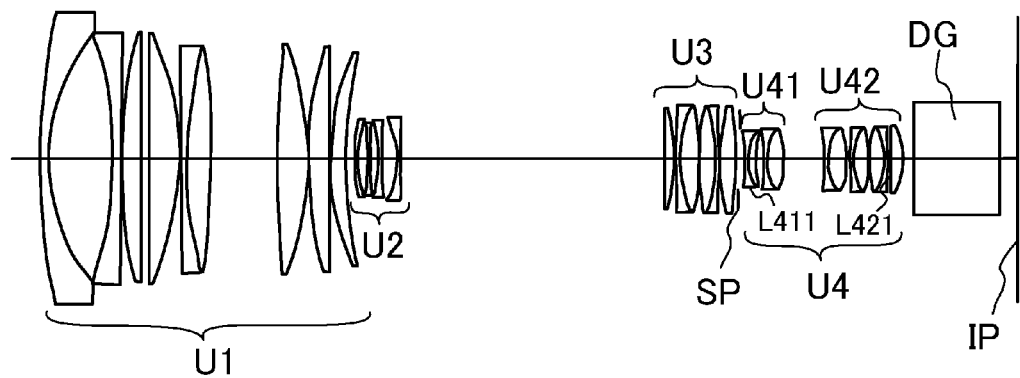
FIG. 1 is a cross-sectional diagram of a zoom lens at a wide-angle end in an infinity focus in Numerical embodiment 1.
Figure 2:
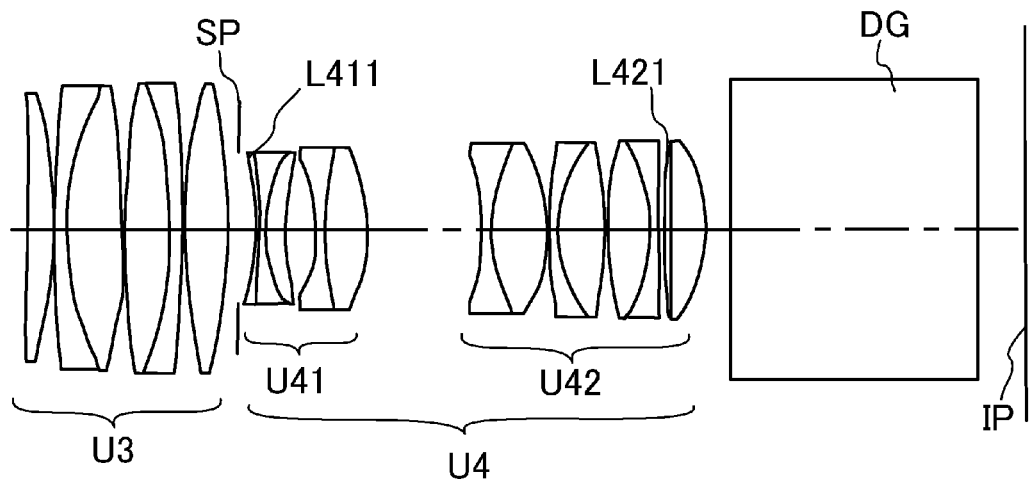
FIG. 2 is an enlarged cross-sectional diagram of a third lens unit (U3) and lens units behind the third lens unit constituting a zoom lens in FIG. 1.
Figure 3A:
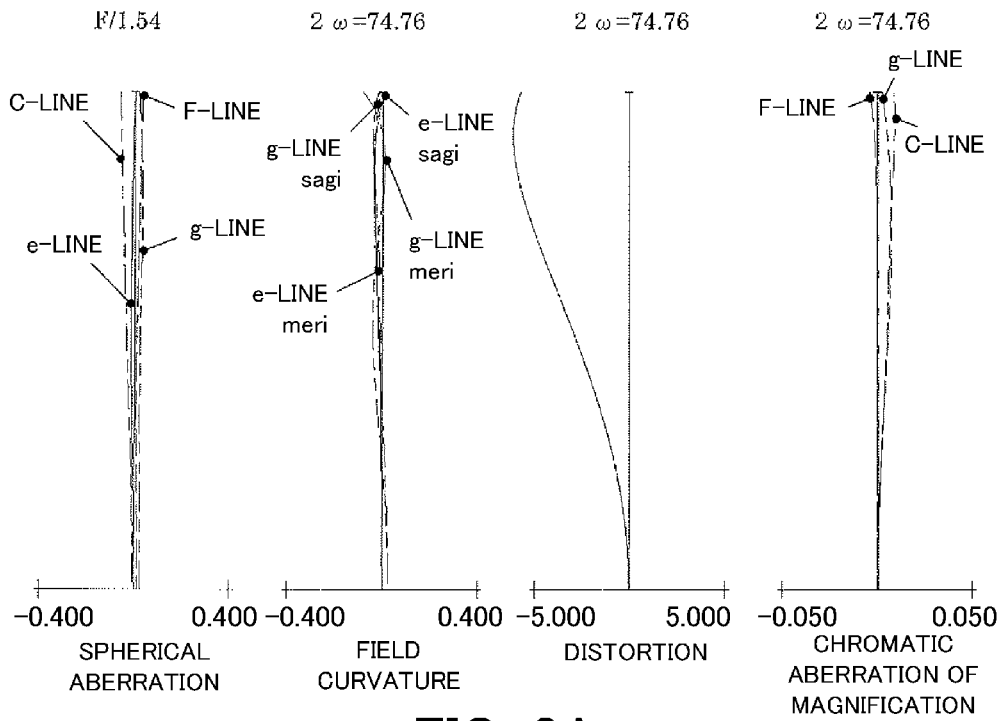
FIG. 3A is an aberration diagram of a zoom lens at a wide-angle end and in a focus of 3.5 m in Numerical embodiment 1.
Figure 3B:
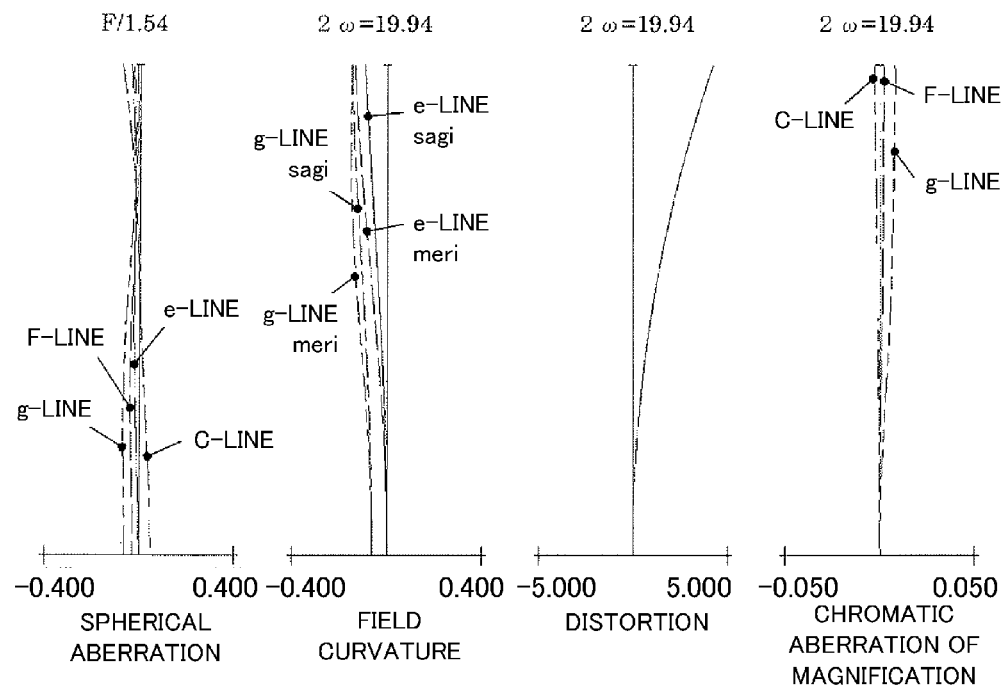
FIG. 3B is an aberration diagram of a zoom lens at a focal length of 31.29 mm and in a focus of 3.5 m in Numerical embodiment 1.
Figure 3C:
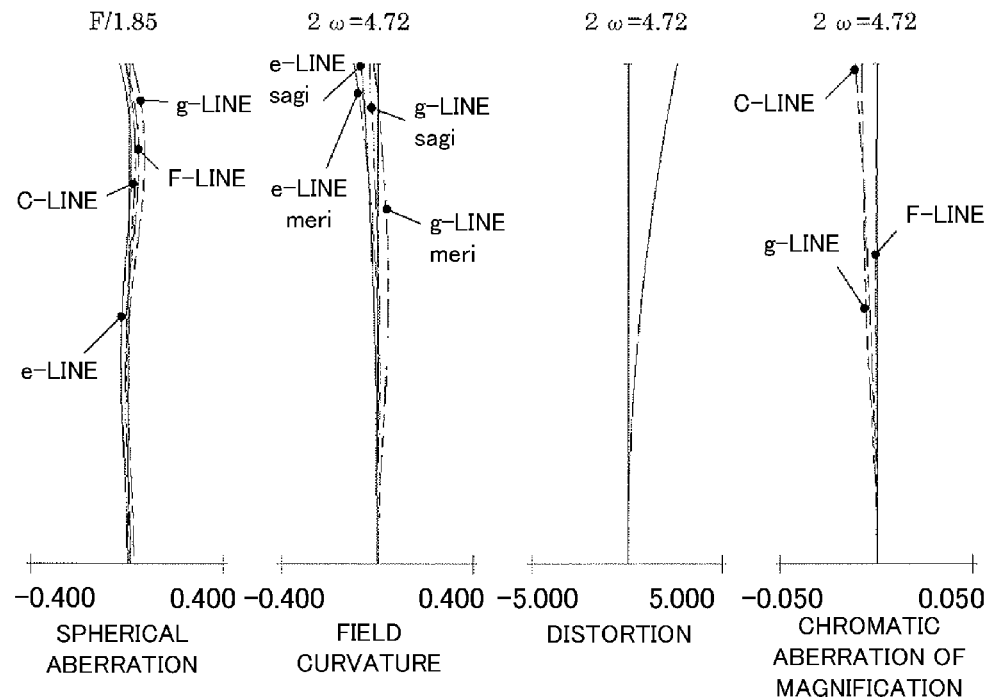
FIG. 3C is an aberration diagram of a zoom lens at a telephoto end and in a focus of 3.5 m in Numerical embodiment 1.
Figure 4:
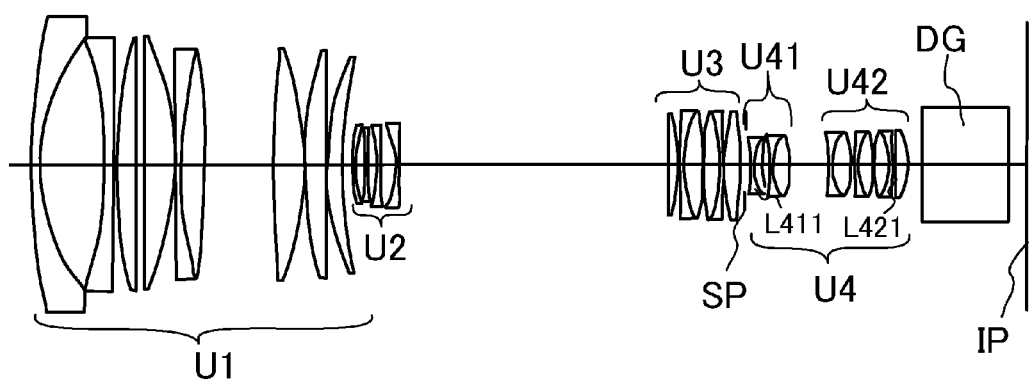
FIG. 4 is a cross-sectional diagram of a zoom lens at a wide-angle end in an infinity focus in Numerical embodiment 2.
Figure 5:
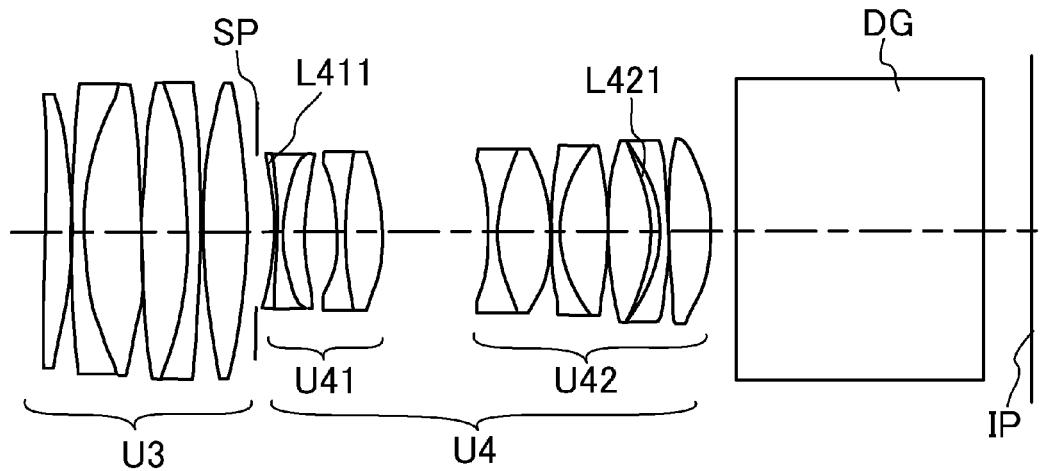
FIG. 5 is an enlarged cross-sectional diagram of a third lens unit (U3) and lens units behind the third lens unit constituting a zoom lens in FIG. 4.
Figure 6A:
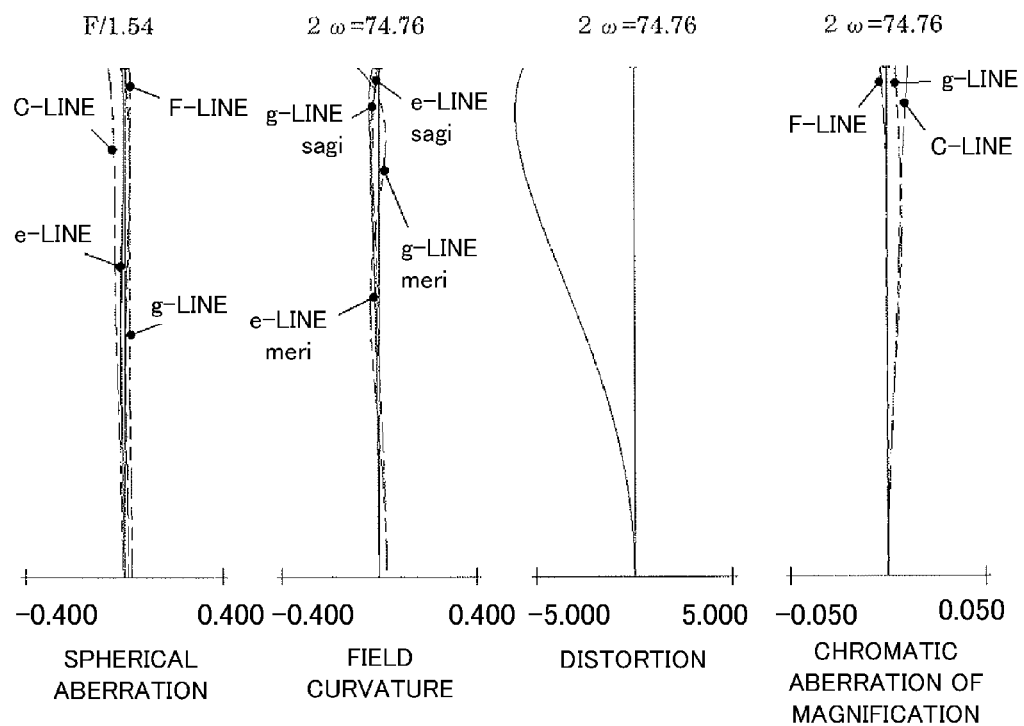
FIG. 6A is an aberration diagram of a zoom lens at a wide-angle end and in a focus of 3.5 m in Numerical embodiment 2.
Figure 6B:
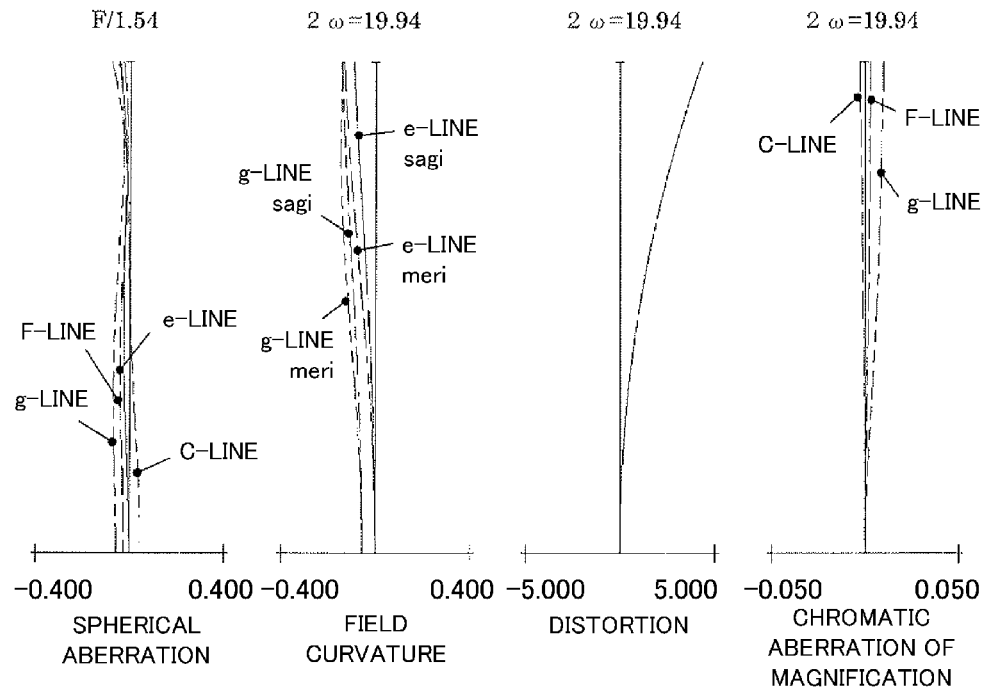
FIG. 6B is an aberration diagram of a zoom lens at a focal length of 31.29 mm and in a focus of 3.5 m in Numerical embodiment 2.
Figure 6C:
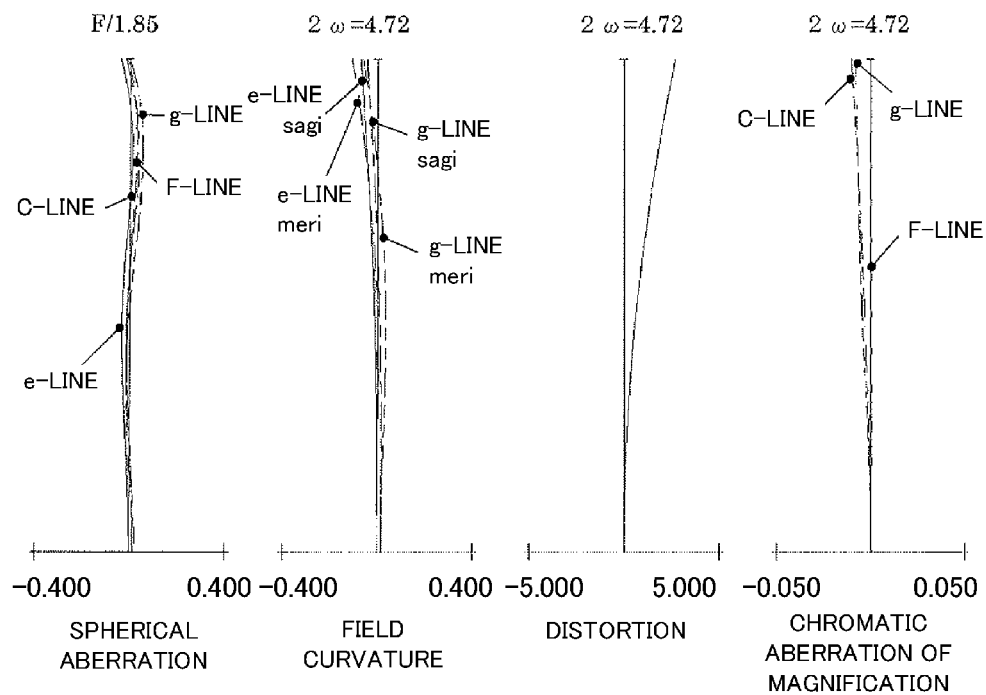
FIG. 6C is an aberration diagram of a zoom lens at a telephoto end and in a focus of 3.5 m in Numerical embodiment 2.

FIG. 1 is a cross-sectional diagram of a zoom lens at a wide-angle end and in focus on an infinite object in Embodiment 1 (Numerical embodiment 1) of the present invention. FIG. 2 is an enlarged explanatory diagram of a portion of FIG. 1. FIGS. 3A to 3C are vertical aberration diagrams of the zoom lens which is in focus on an object of a distance of 3.5 m at the wide-angle end, at the focal length of 31.29 mm, and at the telephoto end in Numerical embodiment 1, respectively. Values of the focal length and the object distance are represented by "mm" in the numerical embodiment described below. The object distance is a distance from an image plane. All of these conditions are the same in each of the following embodiments. FIG. 4 is a cross-sectional diagram of a zoom lens at a wide-angle end and in focus on an infinite object in Embodiment 2 (Numerical embodiment 2) of the present invention. FIG. 5 is an enlarged explanatory diagram of a portion of FIG. 4. FIGS. 6A to 6C are vertical aberration diagrams of the zoom lens which is in focus on an object of a distance of 3.5 m at the wide-angle end, at the focal length of 31.29 mm, and at the telephoto end in Numerical embodiment 2, respectively.

Figure 7:
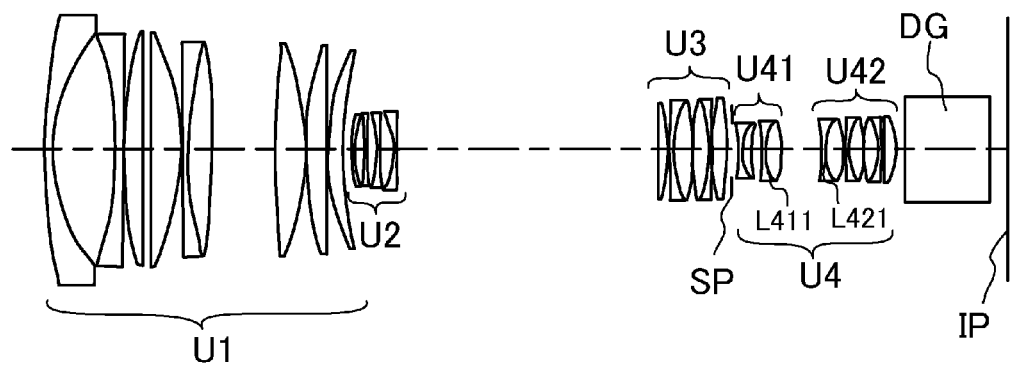
FIG. 7 is a cross-sectional diagram of a zoom lens at a wide-angle end in an infinity focus in Numerical embodiment 3.
Figure 8:
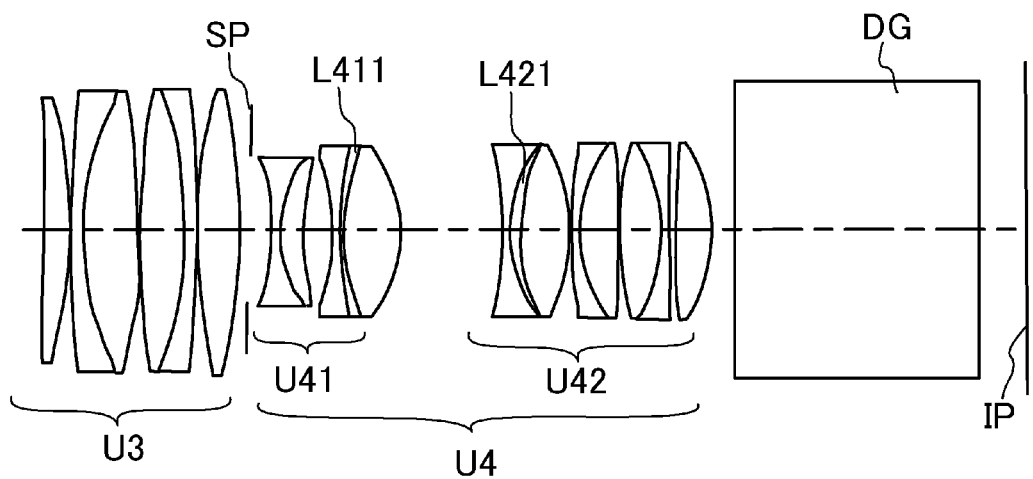
FIG. 8 is an enlarged cross-sectional diagram of a third lens unit (U3) and lens units behind the third lens unit constituting a zoom lens in FIG. 7.
Figure 9A:
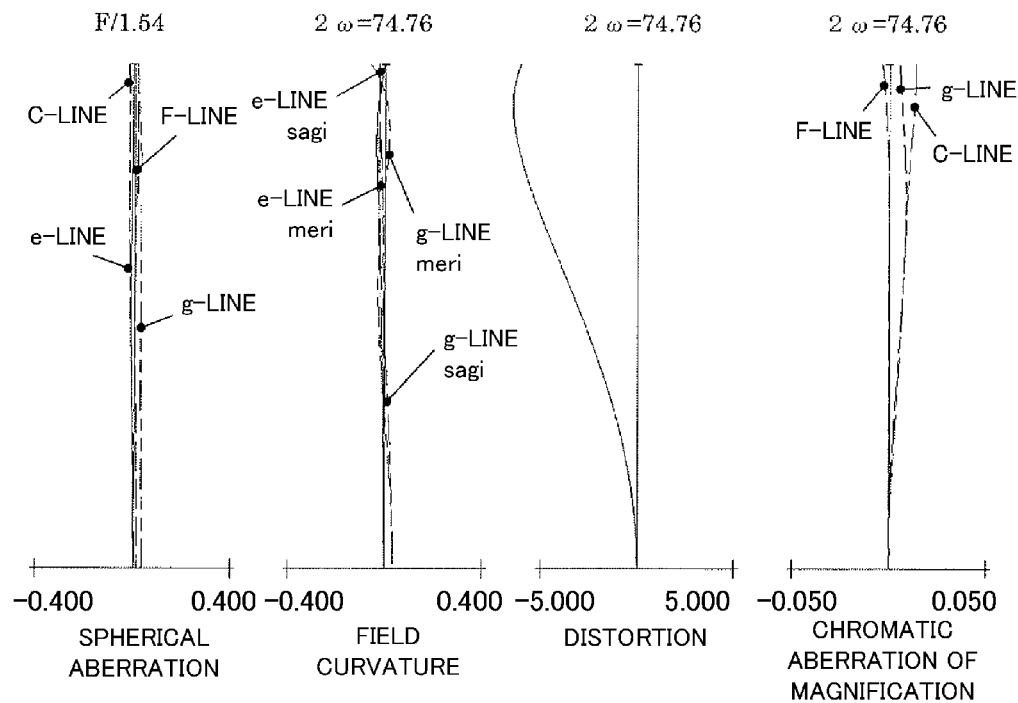
FIG. 9A is an aberration diagram of a zoom lens at a wide-angle end and in a focus of 3.5 m in Numerical embodiment 3.
Figure 9B:
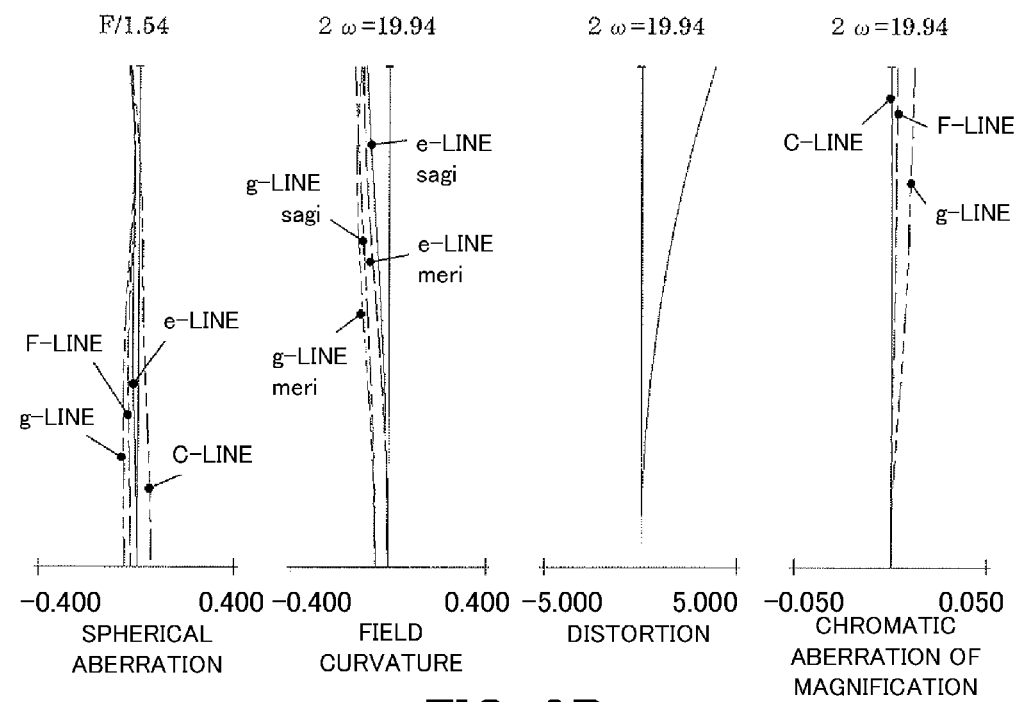
FIG. 9B is an aberration diagram of a zoom lens at a focal length of 31.29 mm and in a focus of 3.5 m in Numerical embodiment 3.
Figure 9C:
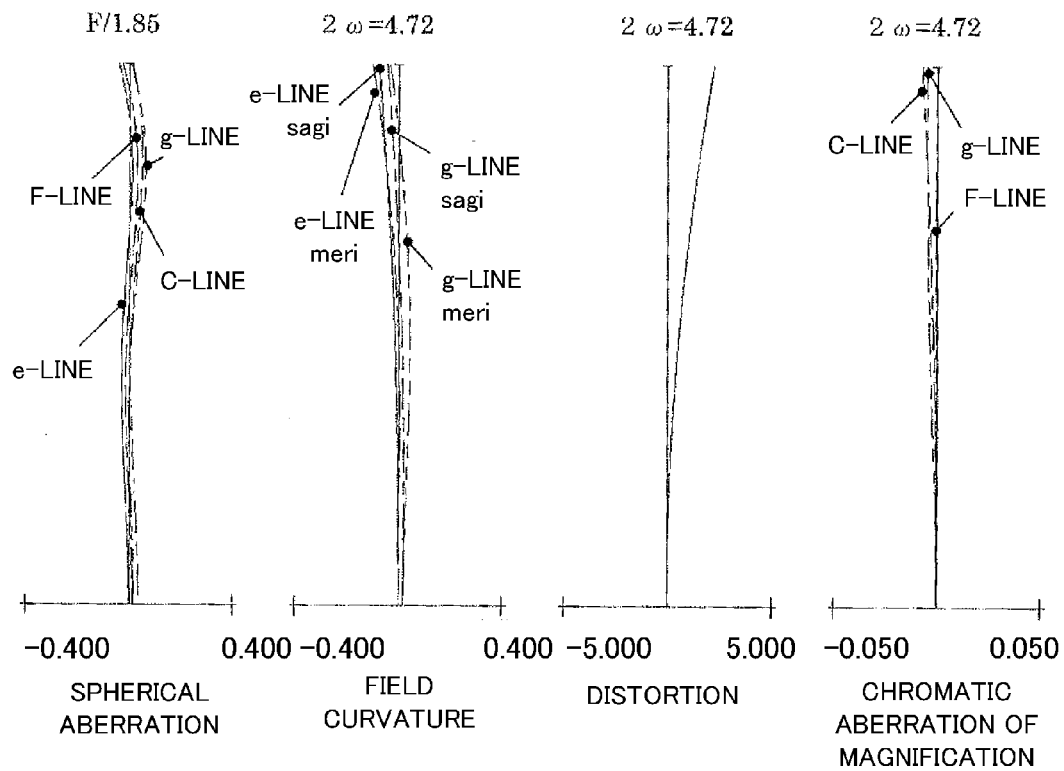
FIG. 9C is an aberration diagram of a zoom lens at a telephoto end and in a focus of 3.5 m in Numerical embodiment 3.
Figure 10:
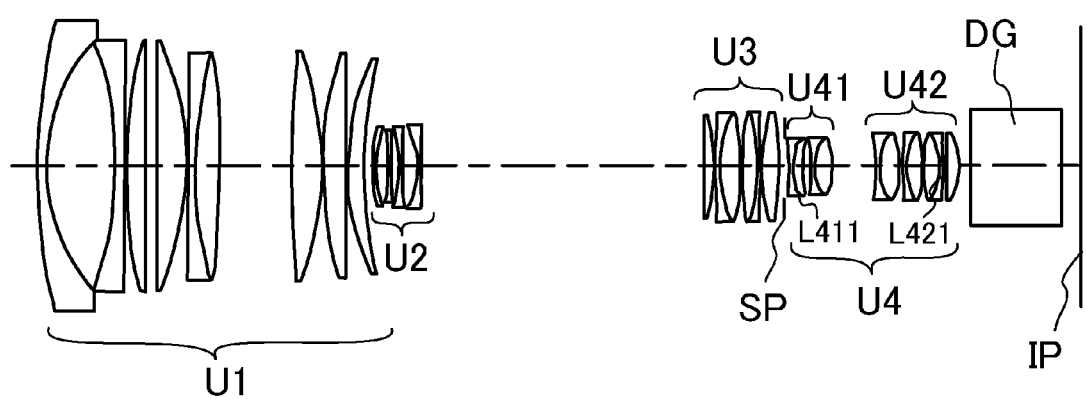
FIG. 10 is a cross-sectional diagram of a zoom lens at a wide-angle end in an infinity focus in Numerical embodiment 4.
Figure 11:
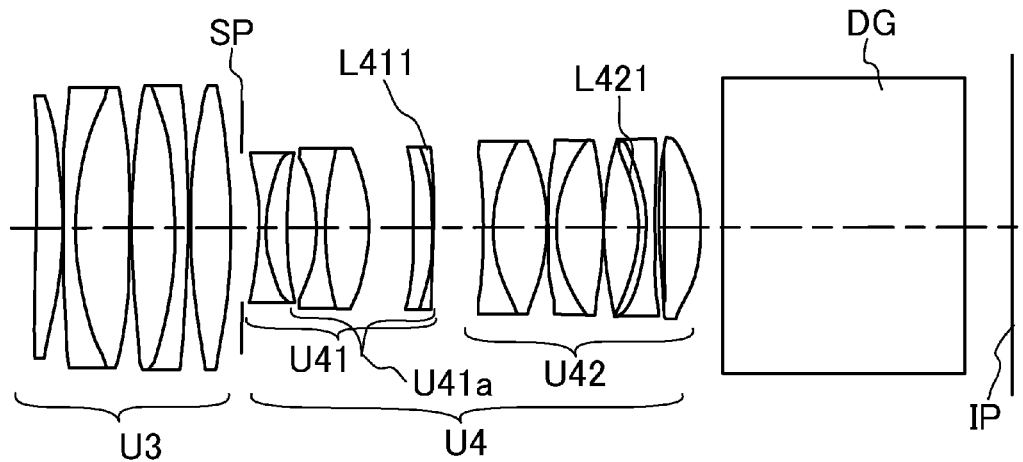
FIG. 11 is an enlarged cross-sectional diagram of a third lens unit (U3) and lens units behind the third lens unit constituting a zoom lens in FIG. 10.
Figure 12A:
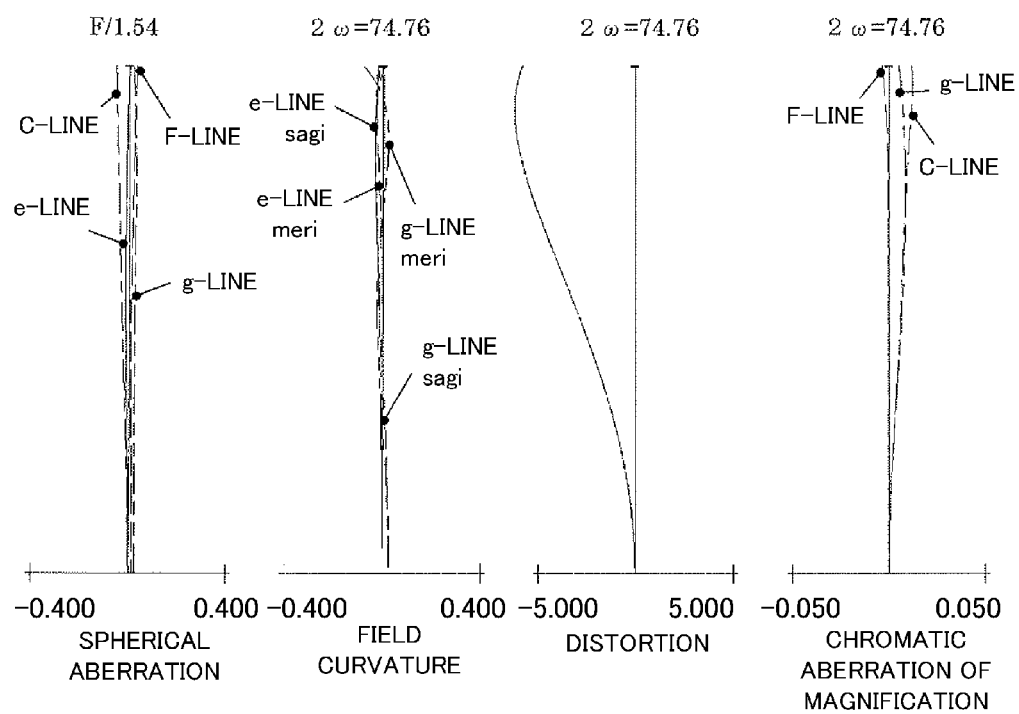
FIG. 12A is an aberration diagram of a zoom lens at a wide-angle end and in a focus of 3.5 m in Numerical embodiment 4.
Figure 12B:
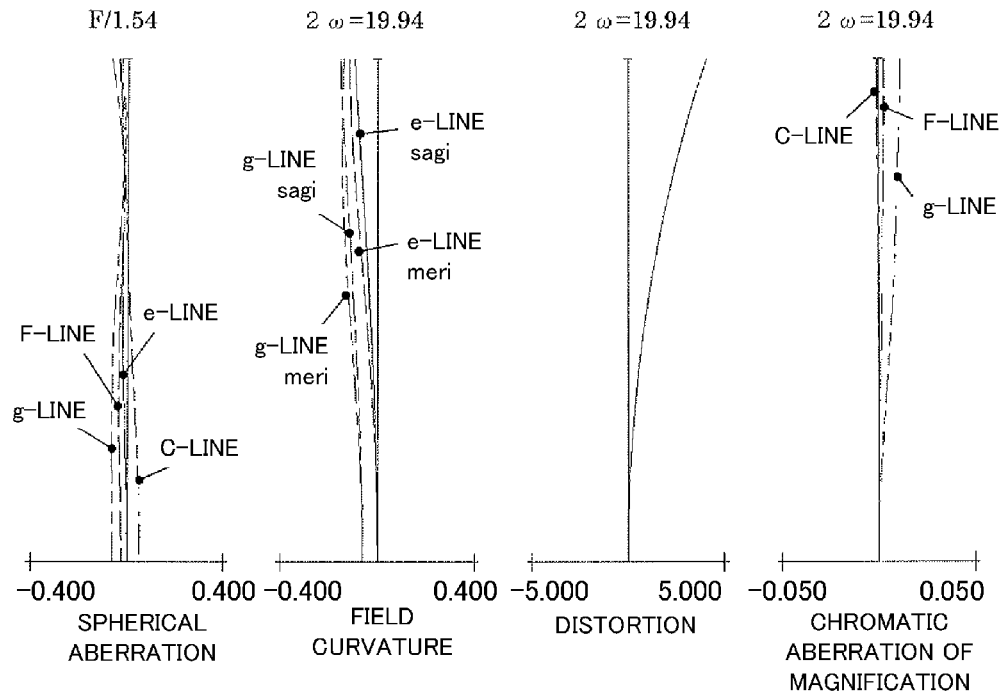
FIG. 12B is an aberration diagram of a zoom lens at a focal length of 31.29 mm and in a focus of 3.5 m in Numerical embodiment 4.
Figure 12C:
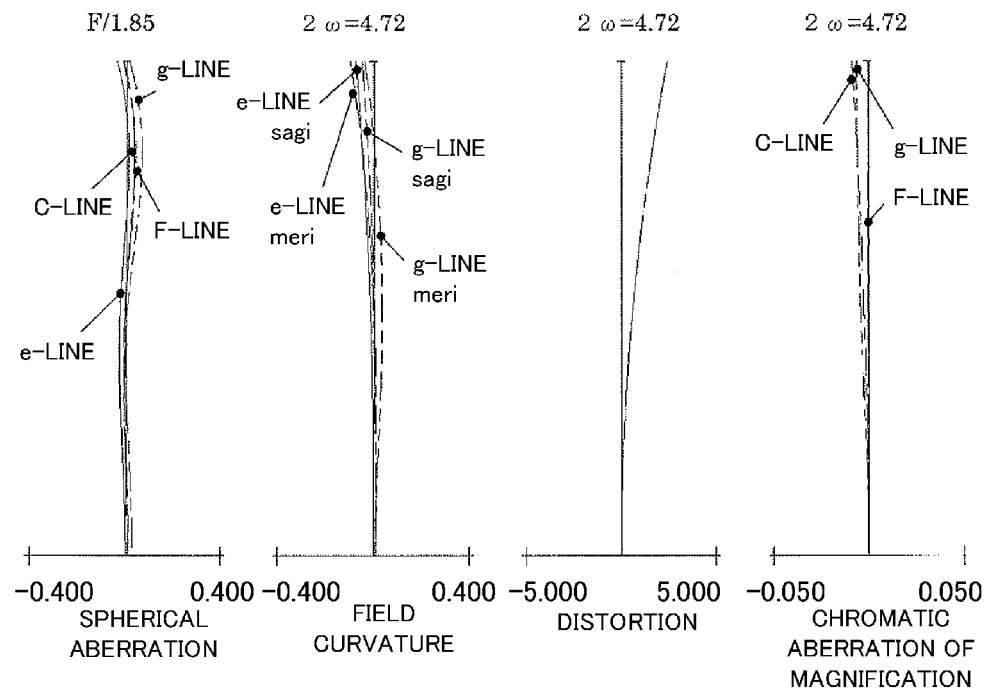
FIG. 12C is an aberration diagram of a zoom lens at a telephoto end and in a focus of 3.5 m in Numerical embodiment 4.

FIG. 7 is a cross-sectional diagram of a zoom lens at a wide-angle end and in focus on an infinite object in Embodiment 3 (Numerical embodiment 3) of the present invention. FIG. 8 is an enlarged explanatory diagram of a portion of FIG. 7. FIGS. 9A to 9C are vertical aberration diagrams of the zoom lens which is in focus on an object of a distance of 3.5 m at the wide-angle end, at the focal length of 31.29 mm, and at the telephoto end in Numerical embodiment 3, respectively. FIG. 10 is a cross-sectional diagram of a zoom lens at a wide-angle end and in focus on an infinite object in Embodiment 4 (Numerical embodiment 4) of the present invention. FIG. 11 is an enlarged explanatory diagram of a portion of FIG. 10. FIGS. 12A to 12C are vertical aberration diagrams of the zoom lens which is in focus on an object of a distance of 3.5 m at the wide-angle end, at the focal length of 31.29 mm, and at the telephoto end in Numerical embodiment 4, respectively.

Figure 13:
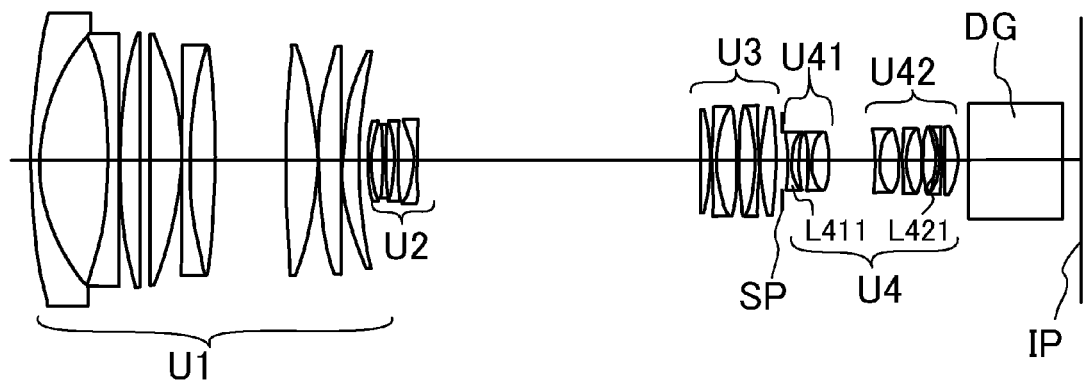
FIG. 13 is a cross-sectional diagram of a zoom lens at a wide-angle end in an infinity focus in Numerical embodiment 5.
Figure 14:
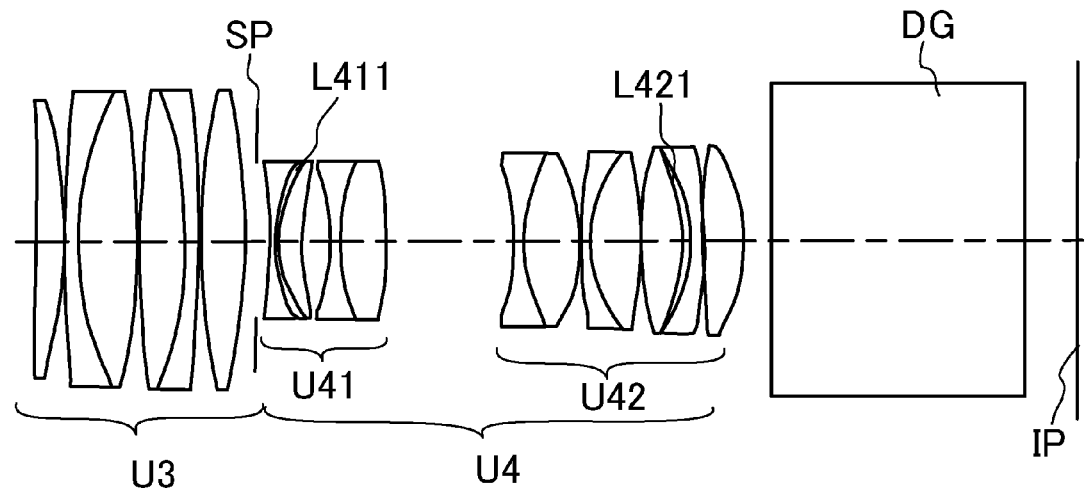
FIG. 14 is an enlarged cross-sectional diagram of a third lens unit (U3) and lens units behind the third lens unit constituting a zoom lens in FIG. 13.
Figure 15A:
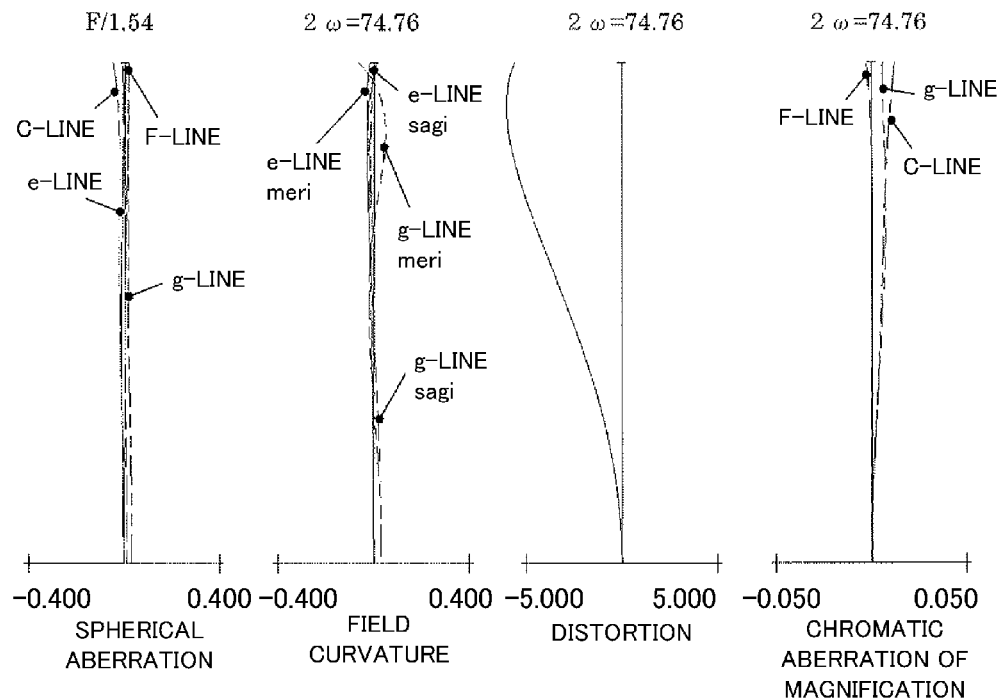
FIG. 15A is an aberration diagram of a zoom lens at a wide-angle end and in a focus of 3.5 m in Numerical embodiment 5.
Figure 15B:
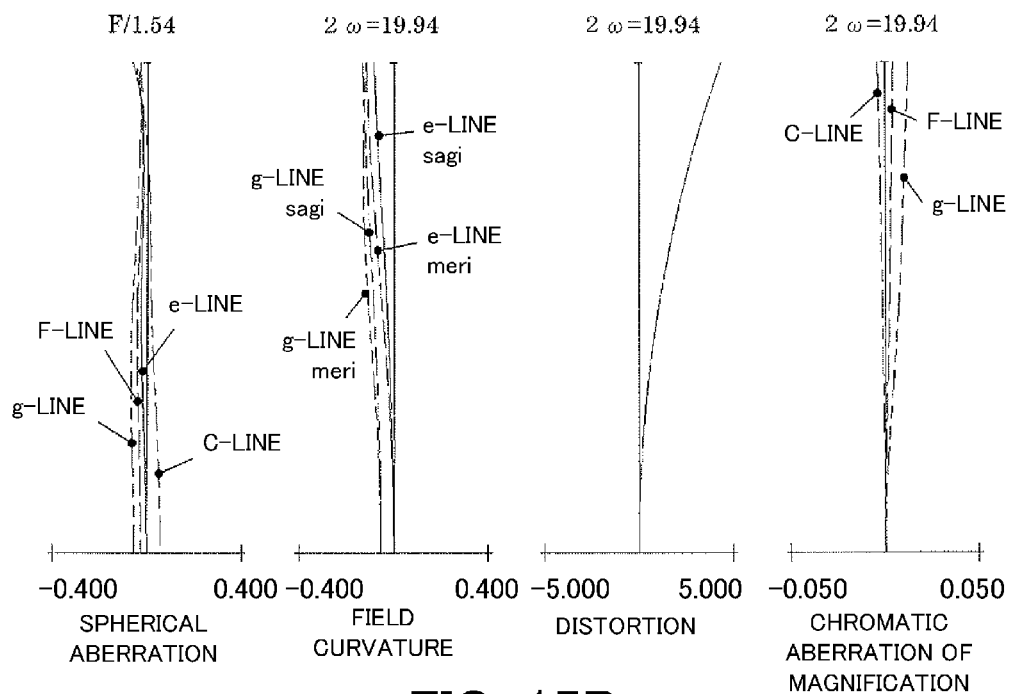
FIG. 15B is an aberration diagram of a zoom lens at a focal length of 31.29 mm and in a focus of 3.5 m in Numerical embodiment 5.
Figure 15C:
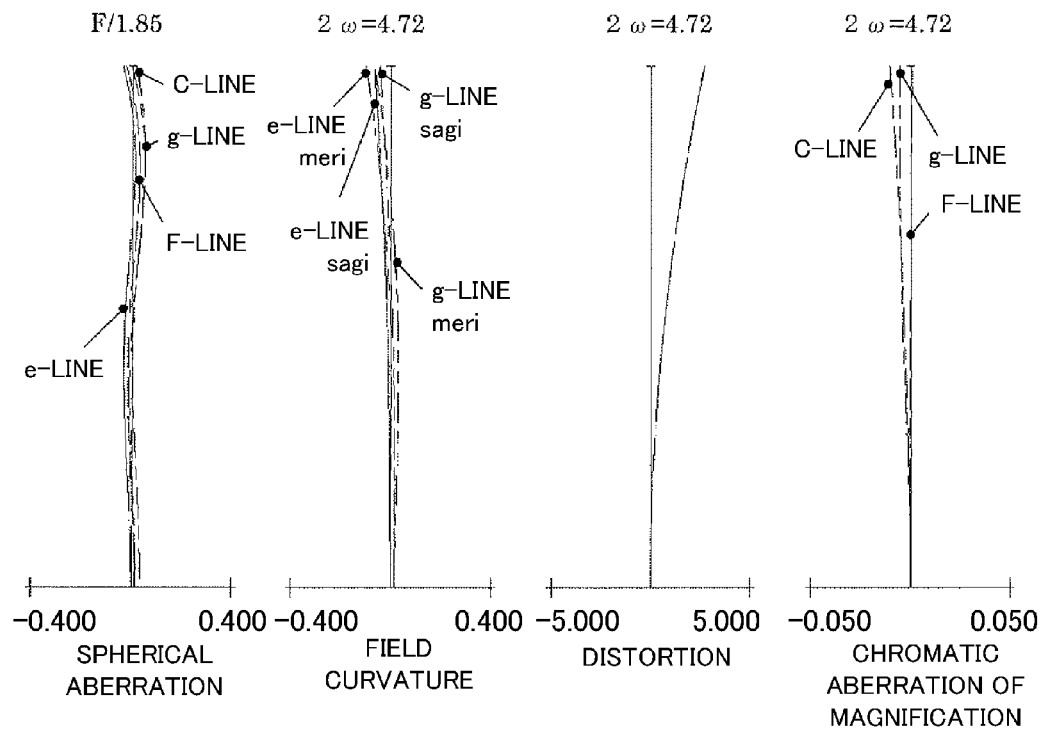
FIG. 15C is an aberration diagram of a zoom lens at a telephoto end and in a focus of 3.5 m in Numerical embodiment 5.
Figure 16:
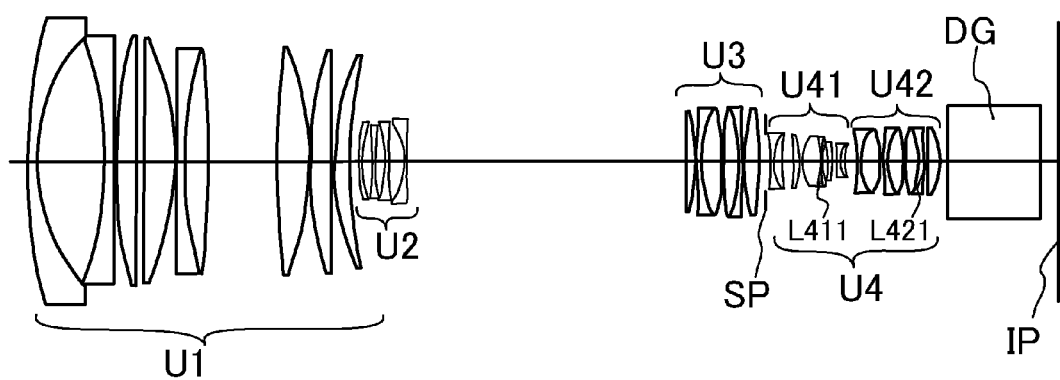
FIG. 16 is a cross-sectional diagram of a zoom lens at a wide-angle end in an infinity focus in Numerical embodiment 6.
Figure 17:
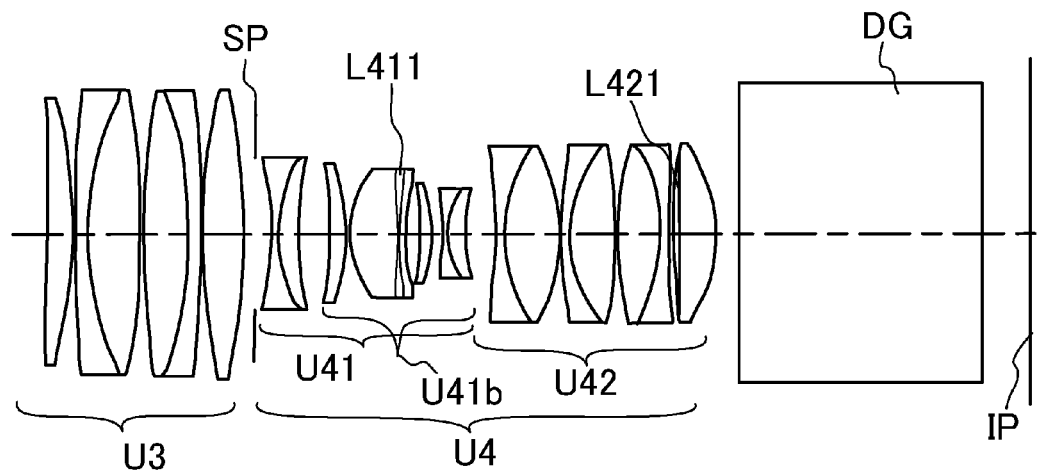
FIG. 17 is an enlarged cross-sectional diagram of a third lens unit (U3) and lens units behind the third lens unit constituting a zoom lens in FIG. 16.
Figure 18A:
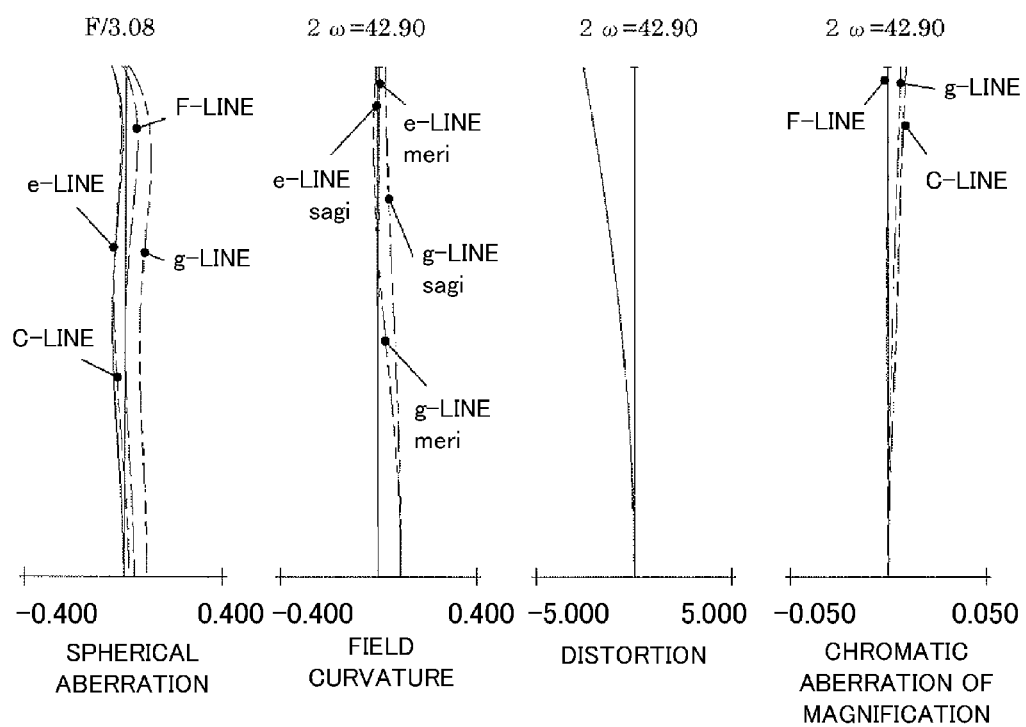
FIG. 18A is an aberration diagram of a zoom lens at a wide-angle end and in a focus of 3.5 m in Numerical embodiment 6.
Figure 18B:
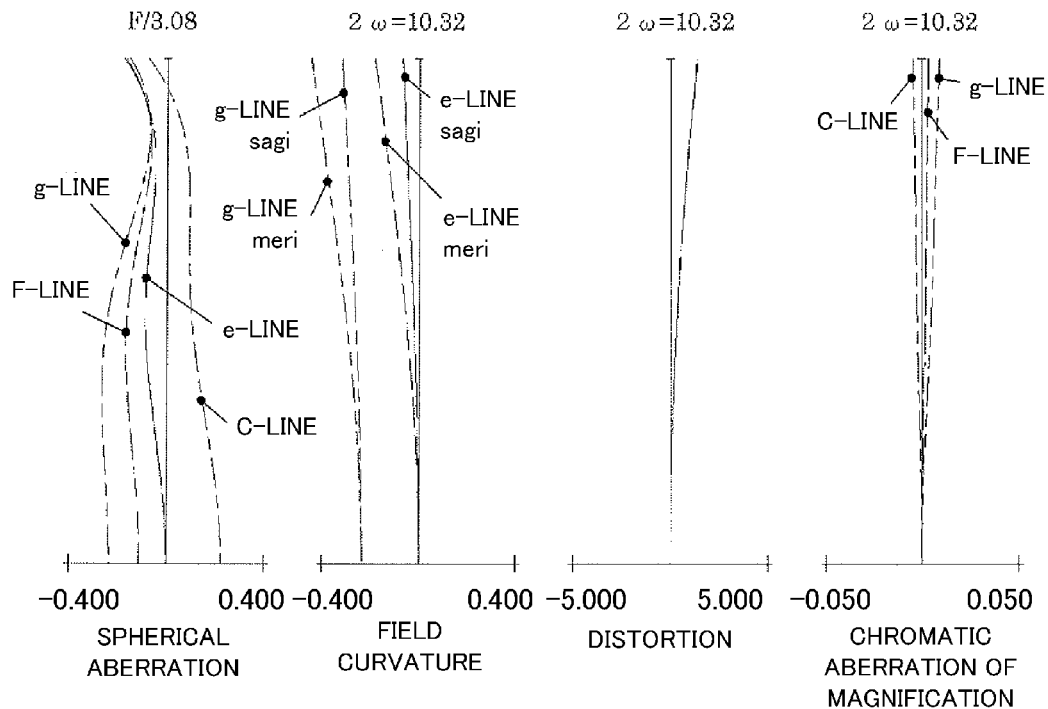
FIG. 18B is an aberration diagram of a zoom lens at a focal length of 60.85 mm and in a focus of 3.5 m in Numerical embodiment 6.
Figure 18C:
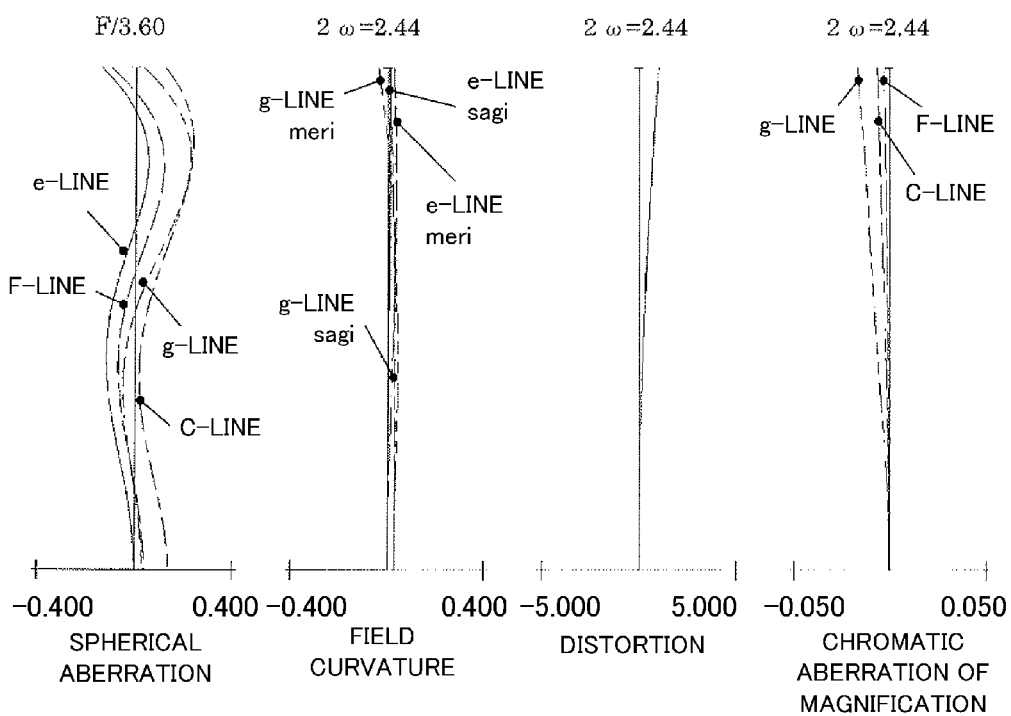
FIG. 18C is an aberration diagram of a zoom lens at a telephoto end and in a focus of 3.5 m in Numerical embodiment 6.

FIG. 13 is a cross-sectional diagram of a zoom lens at a wide-angle end and in focus on an infinite object in Embodiment 5 (Numerical embodiment 5) of the present invention. FIG. 14 is an enlarged explanatory diagram of a portion of FIG. 13. FIGS. 15A to 15C are vertical aberration diagrams of the zoom lens which is in focus on an object of a distance of 3.5 m at the wide-angle end, at the focal length of 31.29 mm, and at the telephoto end in Numerical embodiment 5, respectively. FIG. 16 is a cross-sectional diagram of a zoom lens at a wide-angle end and in focus on an infinite object in Embodiment 6 (Numerical embodiment 6) of the present invention. FIG. 17 is an enlarged explanatory diagram of a portion of FIG. 16. FIGS. 18A to 18C are vertical aberration diagrams of the zoom lens which is in focus on an object of a distance of 3.5 m at the wide-angle end, at the focal length of 31.29 mm, and at the telephoto end in Numerical embodiment 6, respectively.

Figure 19:
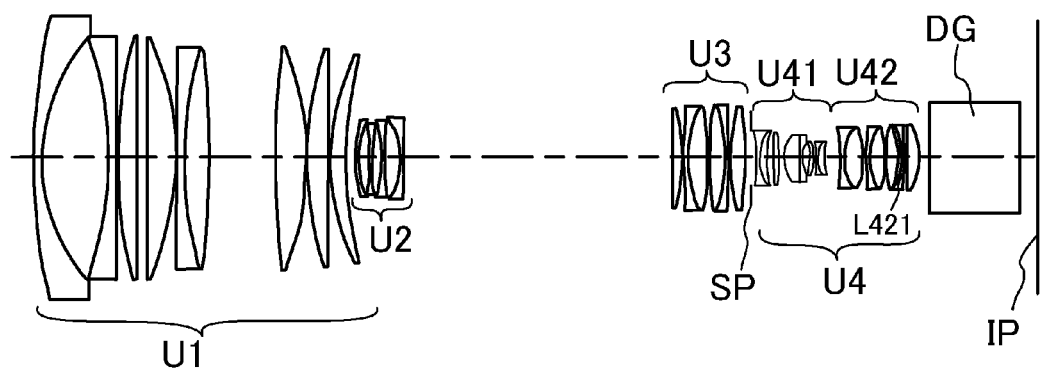
FIG. 19 is a cross-sectional diagram of a zoom lens at a wide-angle end in an infinity focus in Numerical embodiment 7.
Figure 20:
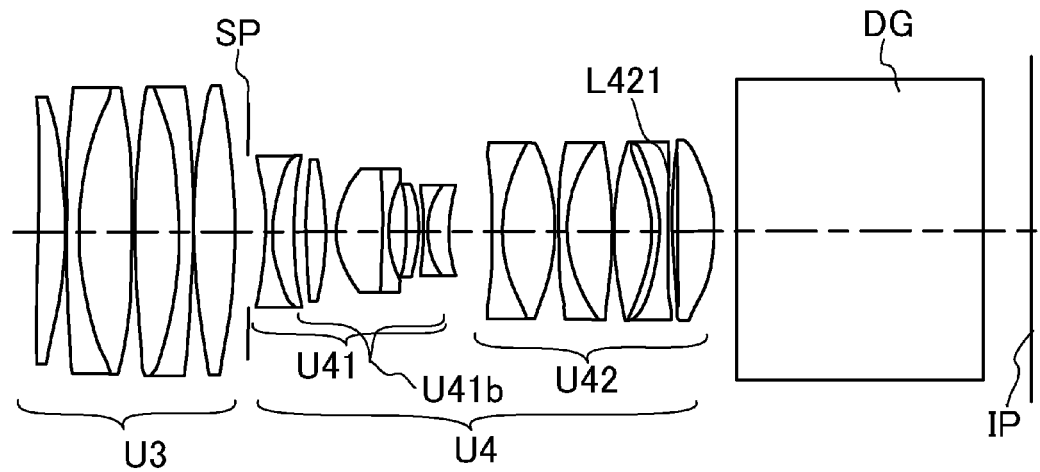
FIG. 20 is an enlarged cross-sectional diagram of a third lens unit (U3) and lens units behind the third lens unit constituting a zoom lens in FIG. 19.
Figure 21A:
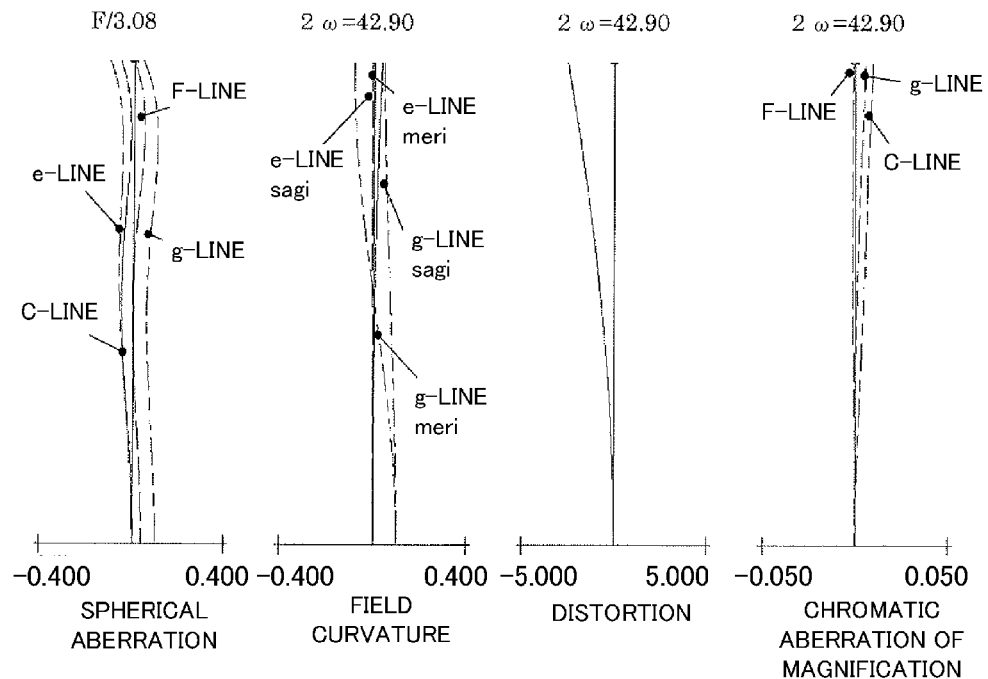
FIG. 21A is an aberration diagram of a zoom lens at a wide-angle end and in a focus of 3.5 m in Numerical embodiment 7.
Figure 21B:
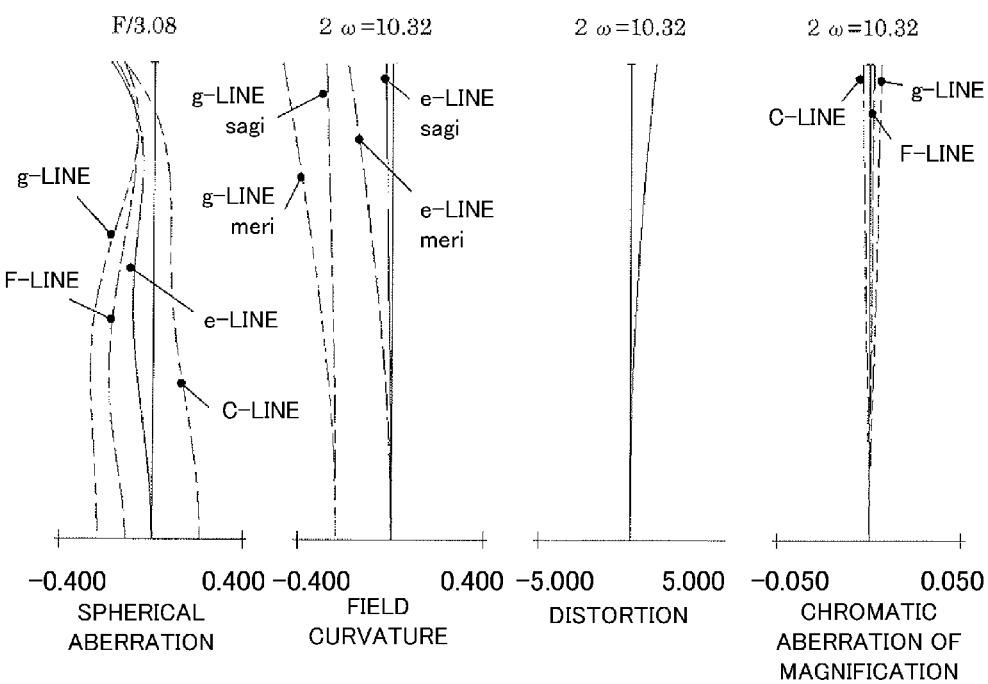
FIG. 21B is an aberration diagram of a zoom lens at a focal length of 61.38 mm and in a focus of 3.5 m in Numerical embodiment 7.
Figure 21C:
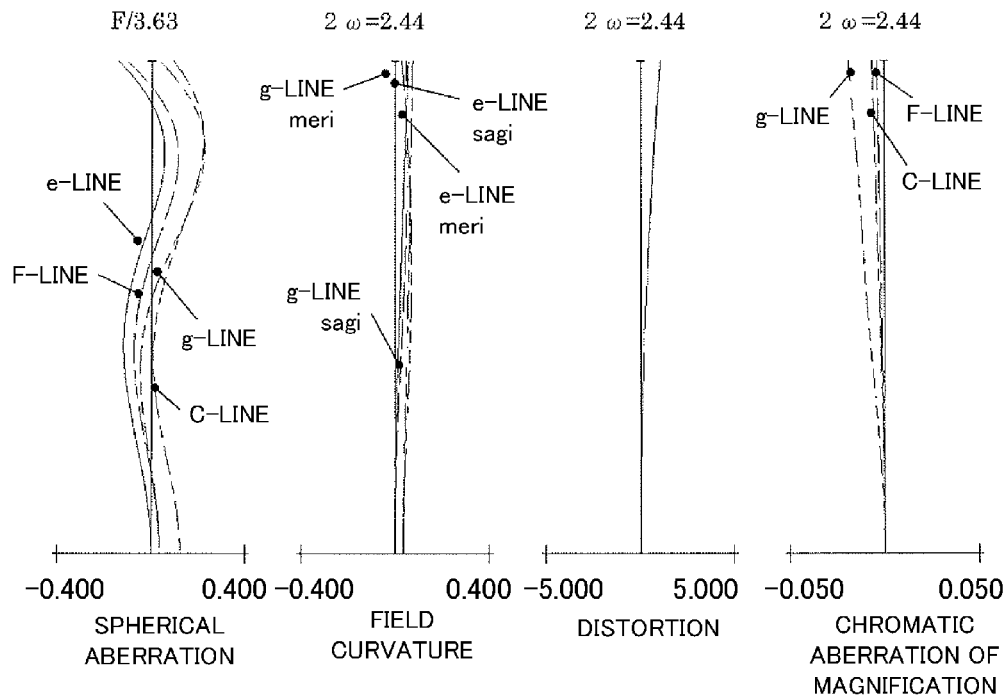
FIG. 21C is an aberration diagram of a zoom lens at a telephoto end and in a focus of 3.5 m in Numerical embodiment 7.
Figure 22:
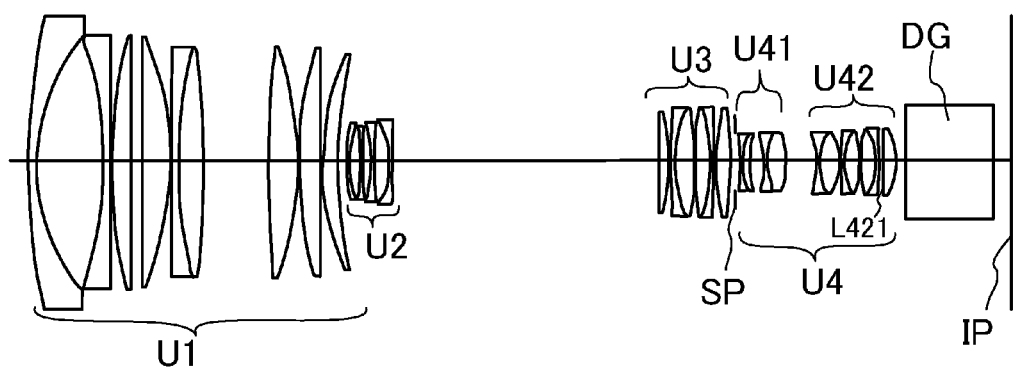
FIG. 22 is a cross-sectional diagram of a zoom lens at a wide-angle end in an infinity focus in Numerical embodiment 8.
Figure 23:
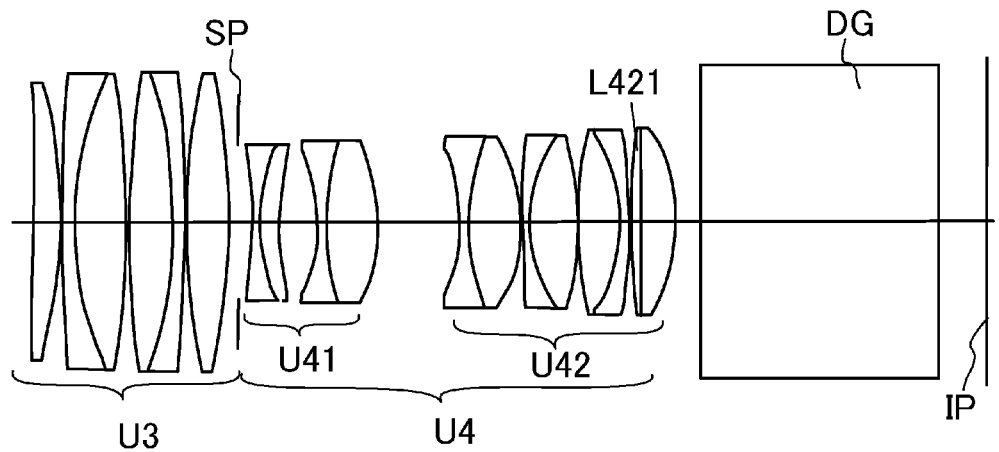
FIG. 23 is an enlarged cross-sectional diagram of a third lens unit (U3) and lens units behind the third lens unit constituting a zoom lens in FIG. 22.
Figure 24A:
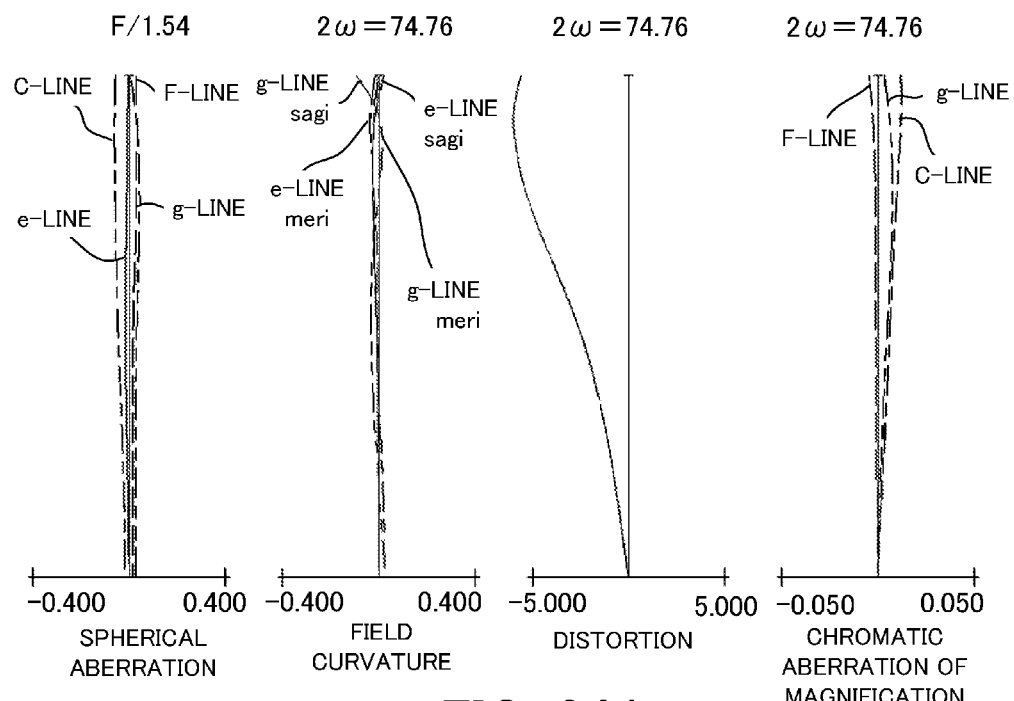
FIG. 24A is an aberration diagram of a zoom lens at a wide-angle end and in a focus of 3.5 m in Numerical embodiment 8.
Figure 24B:
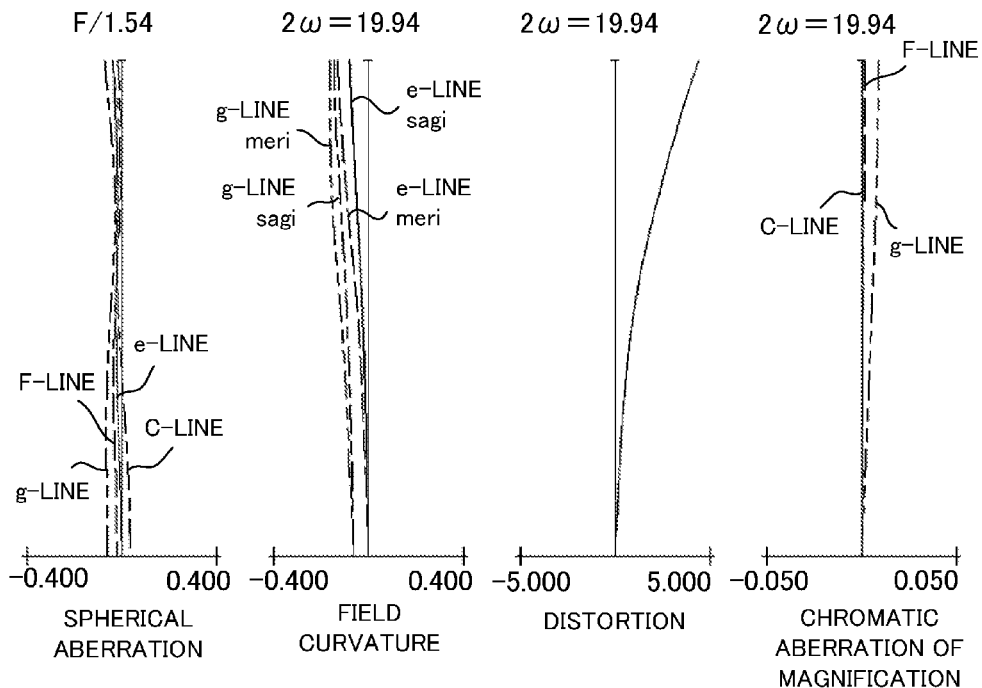
FIG. 24B is an aberration diagram of a zoom lens at a focal length of 31.29 mm and in a focus of 3.5 m in Numerical embodiment 8.
Figure 24C:
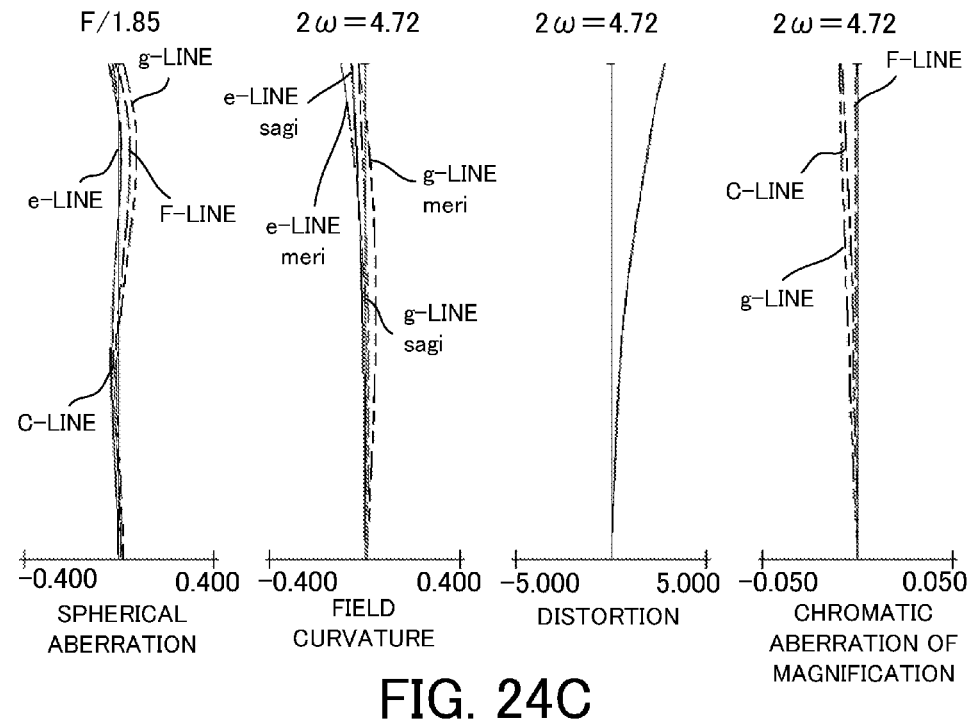
FIG. 24C is an aberration diagram of a zoom lens at a telephoto end and in a focus of 3.5 m in Numerical embodiment 8.

FIG. 19 is a cross-sectional diagram of a zoom lens at a wide-angle end and in focus on an infinite object in Embodiment 7 (Numerical embodiment 7) of the present invention. FIG. 20 is an enlarged explanatory diagram of a portion of FIG. 19. FIGS. 21A to 21C are vertical aberration diagrams of the zoom lens which is in focus on an object of a distance of 3.5 m at the wide-angle end, at the focal length of 31.29 mm, and at the telephoto end in Numerical embodiment 7, respectively. FIG. 22 is a cross-sectional diagram of a zoom lens at a wide-angle end and in focus on an infinite object in Embodiment 8 (Numerical embodiment 8) of the present invention. FIG. 23 is an enlarged explanatory diagram of a portion of FIG. 22. FIGS. 24A to 24C are vertical aberration diagrams of the zoom lens which is in focus on an object of a distance of 3.5 m at the wide-angle end, at the focal length of 31.29 mm, and at the telephoto end in Numerical embodiment 8, respectively.

Figure 25:
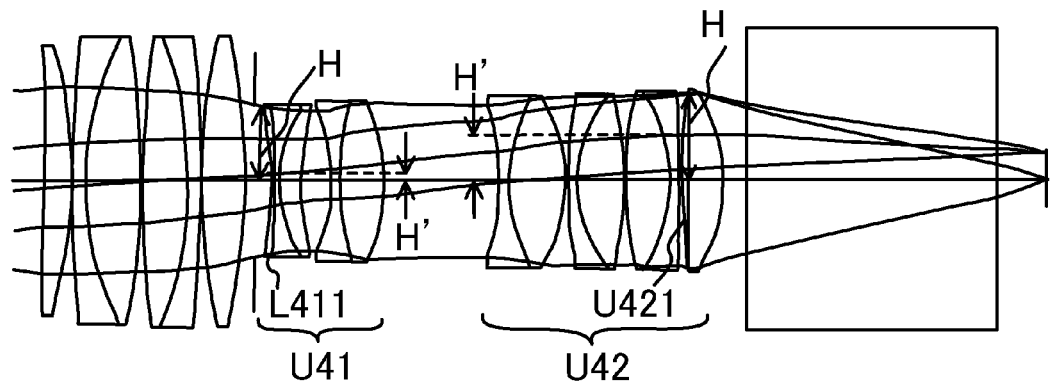
FIG. 25 is a diagram of an optical path of a third lens unit (U3) and lens units behind the third lens unit at a wide-angle end in Numerical embodiment 1.
Figure 26:
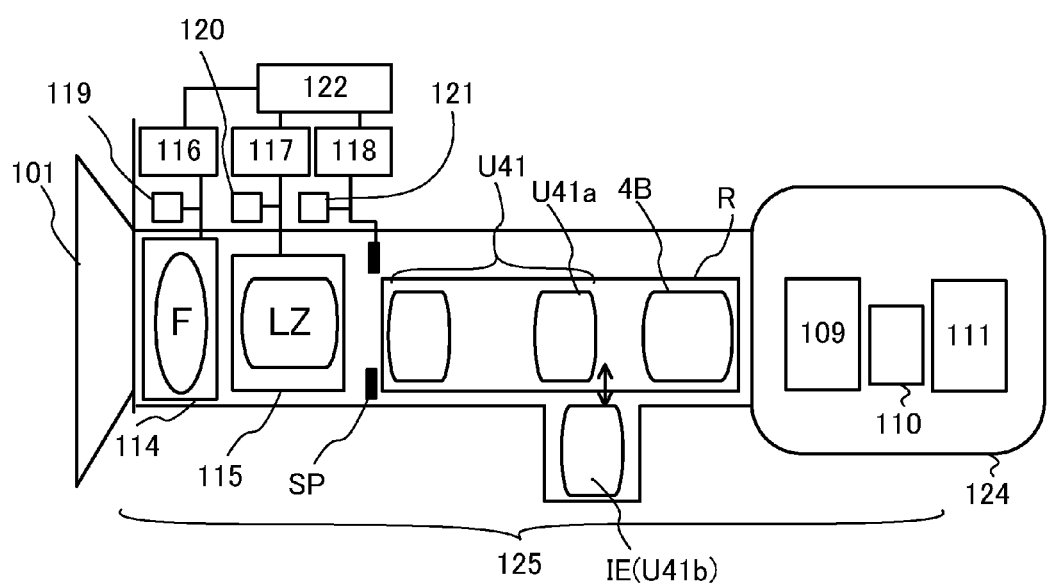
FIG. 26 is a main schematic diagram of an image pickup apparatus in the present invention.

FIG. 25 is an explanatory diagram of an optical path of a third lens unit and lens units behind the third lens unit at a wide-angle end in Numerical embodiment 1. FIG. 26 is a schematic diagram of an image pickup apparatus of the present invention. In the cross-sectional diagram of the zoom lens, U1 denotes a first lens unit which has a positive refractive power and does not move for a zoom operation. The first lens unit U1 has the refractive power to perform a focus operation, and moves the entire or a part of the lens unit having the refractive power to perform the focus operation. U2 denotes a second lens unit (a variator lens unit) which is movable in a zoom operation and has a negative refractive power. U3 denotes a third lens unit (a compensator lens unit) which is movable in the zoom operation and has a positive refractive power for correcting a displacement of an image plane position caused by the magnification varying operation. The third lens unit U3 moves on an optical axis in conjunction with the movement of the second lens unit U2 in performing the magnification varying operation from the wide-angle end to the telephoto end in order to correct the displacement of the image plane caused by the magnification varying operation.

SP denotes an aperture stop and is arranged at the image side of the third lens unit U3. U4 denotes a fourth lens unit (a relay lens unit) which has a positive refractive power to form an image. The fourth lens unit U4 includes a forty-first lens unit U41l having a negative refractive power and a forty-second lens unit U42 having a positive refractive power arranged opposite to each other with reference to the longest air gap. The forty-first lens unit U41 can also be removed from an optical path in order to replace the entire or a part of the lens unit with a different optical system. For example, the entire or a part U41a of the forty-first lens unit U41 can also be replaced with a different optical system U41b to shift a focal length of the whole system to a long focal length side. L411 denotes a negative 411st lens which constitutes a part of the forty-first lens unit U41 and is made of an optical material having an abnormal dispersibility. L421 denotes a positive 421st lens which constitutes a part of the forty-second lens unit U42 and is made of an optical material having an abnormal dispersibility. DG denotes a color separation prism or an optical filter, which is indicated as a glass block. IP denotes an image plane, which corresponds to an imaging area of a solid-state image pickup element (a photoelectric conversion element).

In the aberration diagrams, an e-line is represented as a reference wavelength. In the aberration diagrams, a spherical aberration is indicated for a g-line, an e-line, a C-line, and an F-line. Astigmatism is indicated by a meridional image plane (mari) of the e-line and the g-line and a sagittal image plane (sagi) of the e-line and the g-line. A chromatic aberration of magnification is represented by the g-line, the C-line, and the F-line. Fno denotes an F-number, and ω denotes a half field angle. In all of the aberration diagrams, the spherical aberration, the astigmatism, the distortion, and the chromatic aberration of magnification are depicted with a scale of 0.4 mm, 0.4 mm, 5%, and 0.05 mm, respectively. In each of the following embodiments, the wide-angle end and the telephoto end are zoom positions where the second lens unit U2 for performing the magnification varying operation is mechanically located at both ends in a range movable on the optical axis.

Next, characteristics of each embodiment will be described. In Embodiments 1 to 6 of the present invention, the fourth lens unit U4 is constituted by the forty-first lens unit U41 having a negative refractive power and the forty-second lens unit U42 having a positive refractive power which are arranged opposite to each other with reference to the longest air gap. The forty-first lens unit U41 includes a negative 411st lens L411 and the forty-second lens unit U42 includes a positive 421st lens L421. The Abbe number of a material of the 411st lens L411 and a partial dispersion ratio with respect to the g-line and the F-line are defined as vd411 and θgF411, respectively, and the Abbe number of a material of the 421st lens L421 and a partial dispersion ratio with respect to the g-line and the F-line are defined as vd421 and θgF421, respectively. In this case, the following conditional expressions (1) and (2) are satisfied.

(1)

$$-2.100 \times 10^{-3} \times \nu d_{411} + 0.693 < \theta g F_{411} \quad (1\text{-}1)$$
$$-2.100 \times 10^{-3} \times \nu d_{421} + 0.693 < \theta g F_{421} \quad (1\text{-}2)$$

(2)

$$0.555 < \theta g F_{411} < 0.900 \quad (2\text{-}1)$$
$$0.555 < \theta g F_{421} < 0.900 \quad (2\text{-}2)$$

When an image pickup apparatus including a zoom lens of each embodiment and a solid-state image pickup element which receives light of an image formed by the zoom lens is used, the zoom lens satisfies the following conditional expressions (3) and (4). As shown in FIG. 25, with regard to the 421st lens L421 of the fourth lens unit U4 at the wide-angle end, a height from an optical axis of a light beam passing through the most distant position from the optical axis of an on-axis light beam passing through the 421st lens L421 is defined as H421. In addition, a height from an optical axis of a principal ray of an off-axis light beam having the maximum field angle passing through the 421st lens L421 is defined as H'421. In this case, the 421st lens L421 is arranged at a position which satisfies the following conditional expression (3).

$$0.35 \, H'421/H421 \quad (3)$$

As shown in FIG. 25, with regard to the 411st lens L411, a height of the on-axis light beam which passes through the 411st lens L411 is defined as H411. Further, a height of the principal ray of the off-axis light beam is defined as H'411. In this case, the 411st lens L411 is arranged at a position which satisfies the following Conditional expression (4).

$$H'411/H411 < 0.34 \quad (4)$$

The zoom lens of each of Embodiments 7 and 8 does not include a lens which corresponds to the negative 411st lens L411 in the forty-first lens unit U41. Therefore, the zoom lens of each of Embodiments 7 and 8 only satisfies Conditional expressions (1-2), (2-2), and (3). The zoom lens of each of Embodiments 1 to 6 satisfies the following Conditional expression (5), where f41 is a focal length of the forty-first group U41, f42 is a focal length of the forty-second group U42, fL411 is a focal length of the 411st lens L411, and fL421 is a focal length of the 421st lens L421.

(5)

$$0.25 < f41/fL411 < 0.65 \quad (5\text{-}1)$$
$$0.2 < f42/fL421 < 0.4 \quad (5\text{-}2)$$

The zoom lens of each of Embodiments 1 to 6 satisfies the following Conditional expression (6), where fL411 is a focal length of the 411st lens L411 and fL421 is a focal length of the 421st lens L421.

$$-0.95 < fL411/fL421 < -0.55 \quad (6)$$

The zoom lens of each of Embodiments 7 and 8 does not include a lens which corresponds to the negative 411st lens L411 in the forty-first lens unit U41. Therefore, the zoom lens of each of Embodiments 7 and 8 only satisfies Conditional expressions (5-2) and (7). The zoom lens of each of Embodiments 1 to 8 satisfies the following Conditional expression (7), where f41 is a focal length of the forty-first group U41 and f42 is a focal length of the forty-second group U42.

$$-1.50 < f41/f42 < -0.50 \quad (7)$$

The zoom lens of each embodiment uses a refractive optical element made of an optical material having a strong (large) abnormal dispersibility which satisfies Conditional expressions (1) and (2) as the negative 411st lens L411 in the forty-first lens unit U41 and as the positive 421st lens L421 in the forty-second lens unit U42. The refractive optical element of the embodiment means for example a refractive lens which generates a power by a refractive action, and does not include a diffractive optical element which generates a power by a diffractive action. The optical material is solid in a state of using the optical system, but it may be a different state before using the optical system, for example at the time of the manufacture. For example, at the time of the manufacture, it may be a liquid material or may also be a solid material by hardening it. The Abbe number vd and the partial dispersion ratio θgF in Conditional expressions (1) and (2) are physical quantities which are defined by the following Conditional expressions (8) and (9). Ng, NF, Nd, and NC in Conditional expressions (8) and (9) are refractive indexes of the material with respect to a g-line (wavelength of 435.8 nm), an F-line (wavelength of 486.1 nm), a d-line (wavelength of 587.6 nm), and a C-line (wavelength of 656.3 nm), respectively.

$$\nu d = (Nd-1)/(NF-NC) \quad (8)$$

$$\theta gF = (Ng-NF)/(NF-NC) \quad (9)$$

The arrangement of a lens in the optical system which is the most effective for correcting the chromatic aberration of magnification using the abnormal dispersibility can be determined by analyzing a paraxial arrangement of the lens. The main reference of the analysis is a ratio of optical path heights of an on-axis light beam and an off-axis light beam in the lens from an optical axis and a largeness of the refractive power of the lens in considering a lens diameter.

In a zoom type of the zoom lens of each embodiment, the arrangement of the 421st lens L421 which is made of the optical material satisfying Conditional expressions (1) and (2) at a position closest to the image plane in a lens system or in the vicinity of the position can be the most effective for correcting the chromatic aberration of magnification at the wide-angle end. Including examples shown in Numerical embodiments 1 to 8 described below or other similar cases, the arrangement of the 421st lens L421 which is made of the optical material for the forty-second lens unit U42 of the zoom type of the zoom lens in each embodiment can efficiently correct the chromatic aberration of magnification. In addition, in Embodiments 1 to 6, an on-axis chromatic aberration at the wide-angle end which is generated by the 421st lens L421 of the forty-second lens unit U42 is corrected by arranging the 411st lens L411 which is made of the above optical material in the forty-first lens unit U41 based on the similar analysis. In other words, the chromatic aberration of magnification and the on-axis chromatic aberration are effectively corrected by the positive 421st lens L421. For this reason, the optical material satisfying Conditional expressions (1) and (2) is used as the negative 411st lens L411 for the forty-first lens unit U41 and as the positive 421st lens L421 for the forty-second lens unit U42. Thus, the on-axis chromatic aberration and the chromatic aberration of magnification are well corrected.

It is difficult to well correct the chromatic aberration of magnification at the wide-angle end because the abnormal dispersibility becomes small if Conditional expressions (1) and (2) are not satisfied. The zoom lens of each of Embodiments 7 and 8 does not include the negative 411st lens L411, but it includes the positive 421st lens L421 to obtain a desired effect. A specific optical material which satisfies Conditional expressions (1) and (2) is for example a UV cured resin (Nd=1.635, νd=22.7, θgF=0.69) or Poly-N-vinylcarbazole (Nd=1.696, νd=17.7, θgF=0.69). If Conditional expressions (1) and (2) are satisfied, the embodiment is not limited to them. Preferably, partial dispersion ratios θgd411 and θgd421 with respect to the d-line and the g-line in the optical materials of the 411st lens and the 421st lens which satisfy Conditional expressions (1) and (2) satisfy the following Conditional expressions (10) and (11).

(10)

$$-2.407 \times 10^{-3} \times \nu d_{411} + 1.420 < \theta g d_{411} \quad (10\text{-}1)$$
$$-2.407 \times 10^{-3} \times \nu d_{421} + 1.420 < \theta g d_{421} \quad (10\text{-}2)$$

(11)

$$1.255 < \theta g d_{411} < 1.670 \quad (11\text{-}1)$$
$$1.255 < \theta g d_{421} < 1.670 \quad (11\text{-}2)$$

The partial dispersion ratio θgd with respect to the g-line and the d-line is represented by the following expression.

$$\theta gd = (Ng-Nd)/(NF-NC)$$

If Conditional expressions (10) and (11) in addition to Conditional expressions (1) and (2) are satisfied, it is easy to well correct the chromatic aberration between the g-line and the d-line. Thus, the precise correction of the chromatic aberration in a wavelength range between the g-line and the C-line is easily performed. Since the zoom lens of each of Embodiments 7 and 8 does not include the negative 411st lens L411, it only satisfies Conditional expressions (10-2) and (11-2). In the image pickup apparatus having the zoom lens of each of Embodiments 1 to 6, the positive 421st lens L421 of the forty-second lens unit U42 satisfies Conditional expression (3), and the negative 411st lens L411 of the forty-first lens unit U41 satisfies Conditional expression (4).

Conditional expression (3) defines an arrangement position of the positive 421st lens L421 in the optical path for effectively correcting the chromatic aberration of magnification at the wide-angle end. When Conditional expression (3) exceeds the lower limit, it is not good because the effective correction of the chromatic aberration of magnification at the wide-angle end is difficult and also the on-axis chromatic aberration is deteriorated. Using the positive 421st lens L421 can effectively correct the chromatic aberration of magnification, but the on-axis chromatic aberration is not a little deteriorated at the wide-angle end. Conditional expression (4) defines an arrangement position of the negative 411st lens L411 in the optical path for correcting the on-axis chromatic aberration with maintaining the correction effect of the chromatic aberration of magnification of the positive 421st lens L421 at the wide-angle end. When Conditional expression (4) exceeds the upper limit, the on-axis chromatic aberration is excessively corrected and also the correction effect of the chromatic aberration of magnification by the positive 421st lens L421 is cancelled. As a result, the correction of the chromatic aberration of magnification is insufficient.

Because the zoom lens of each of Embodiments 7 and 8 does not include the negative 411st lens L411, it only satisfies Conditional expression (3). The image pickup apparatus having the zoom lens of each of Embodiments 1 to 6 satisfies Conditional expression (5). Conditional expression (5) defines the relationships between the focal length f41 of the forty-first lens unit U41 and the focal length fL411 of the 411st lens L411, and the focal length of f42 of the forty-second group U42 and the focal length fL421 of the 421st lens L421 for effectively correcting the chromatic aberration of magnification and the on-axis chromatic aberration. If Conditional expression (5) exceeds the lower limit, the correction effects of the chromatic aberration of magnification and the on-axis chromatic aberration cannot be sufficiently obtained. On the other hand, if Conditional expression (5) exceeds the upper limit, the correction effects of the chromatic aberration of magnification and the on-axis chromatic aberration are excessive. Since the zoom lens of each of Embodiments 7 and 8 does not include the negative 411 lens L411, it only satisfies Conditional expression (5-2).

The image pickup apparatus having the zoom lens of each of Embodiments 1 to 6 satisfies Conditional expression (6). Conditional expression (6) defines the relationship between the focal length fL411 of the 411st lens L411 and the focal length fL421 of the 421st lens L421 to effectively correct the chromatic aberration of magnification and the on-axis chromatic aberration. If Conditional expression (6) exceeds the lower limit, the correction effect of the on-axis chromatic aberration cannot be sufficiently obtained. On the other hand, if Conditional expression (6) exceeds the upper limit, the correction effect of the on-axis chromatic aberration is excessive. The image pickup apparatus having the zoom lens of each of Embodiments 1 to 8 satisfies Conditional expression (7). Conditional expression (7) defines the relationship between the focal length f41 of the forty-first lens unit U41 and the focal length f42 of the forty-second lens unit U42 to well correct various kinds of aberrations such as a spherical aberration, as well as the chromatic aberration of magnification and the on-axis chromatic aberration. If Conditional expression (7) exceeds the lower limit, the correction of the spherical aberration is insufficient. On the other hand, if Conditional expression (7) exceeds the upper limit, the correction of the spherical aberration is excessive. Preferably, numerical ranges of Conditional expressions (2) to (4), and (11) are set as follows.

$$0.6 < \theta g F_{411} < 0.8 \quad (2a)$$
$$0.6 < \theta g F_{421} < 0.8$$

$$0.37 < H'421/H421 \quad (3a)$$

$$H'411/H411 < 0.32 \quad (4a)$$

$$1.30 < \theta g d_{411} < 1.55 \quad (11a)$$
$$1.30 < \theta g d_{421} < 1.55$$

As described above, according to each embodiment, a lens including an optical material having the abnormal dispersibility is used at an appropriate position at the image plane side with reference to the position of a stop. Thus, a zoom lens which appropriately corrects the on-axis chromatic aberration and the chromatic aberration of magnification particularly at the wide-angle end and has a high (good) optical performance throughout an entire zoom range can be obtained. In Numerical embodiments 1 to 8 described below, Table 1 shows numerical values of refractive indexes of the d-line, g-line, C-line, and F-line, the Abbe number vd, and the partial dispersion ratios θgd and θgF of the optical material having the abnormal dispersibility with regard to Conditional expressions (1) and (2). Table 2 shows focal lengths of the forty-first lens unit U41 and the forty-second lens unit U42 in Numerical embodiments 1 to 8. Table 3 shows focal lengths of the negative 411st lens L411 and the positive 421st lens L421 in Numerical embodiments 1 to 8. Table 4 shows numerical values corresponding to Conditional expressions (1) to (4), (10), and (11) in Numerical embodiments 1 to 8. Table 5 shows numerical values corresponding to Conditional expressions (5) to (7) in Numerical embodiments 1 to 8.

TABLE 1

|  | UV CURED RESIN | POLY-N-VINYLCARBAZOLE |
|---|---|---|
| D-LINE REFRACTIVE INDEX | 1.63555 | 1.69591 |
| G-LINE REFRACTIVE INDEX | 1.67532 | 1.75164 |
| C-LINE REFRACTIVE INDEX | 1.62807 | 1.68528 |
| F-LINE REFRACTIVE INDEX | 1.65604 | 1.72465 |
| vd | 22.7 | 17.7 |
| θgd | 1.422 | 1.415 |
| θgF | 0.689 | 0.686 |

TABLE 2

|  | EMBODIMENT 1 | EMBODIMENT 2 | EMBODIMENT 3 | EMBODIMENT 4 |
|---|---|---|---|---|
| FOCAL LENGTH OF FORTY-FIRST LENS UNIT | −58.74 | −63.74 | −69.80 | −49.60 |
| FOCAL LENGTH OF FORTY-SECOND LENS UNIT | 46.92 | 45.25 | 51.59 | 47.93 |

|  | EMBODIMENT 5 | EMBODIMENT 6 | EMBODIMENT 7 | EMBODIMENT 8 |
|---|---|---|---|---|
| FOCAL LENGTH OF FORTY-FIRST LENS UNIT | −50.05 | −25.48 | — | — |
| FOCAL LENGTH OF FORTY-SECOND LENS UNIT | 44.12 | 47.93 | 47.93 | 45.74 |

TABLE 3

|  | EMBODIMENT 1 | EMBODIMENT 2 | EMBODIMENT 3 | EMBODIMENT 4 |
|---|---|---|---|---|
| FOCAL LENGTH OF NEGATIVE 411ST LENS | −136.34 | −141.58 | −116.45 | −126.15 |
| FOCAL LENGTH OF POSITIVE 421ST LENS | 157.03 | 169.50 | 153.08 | 134.96 |

|  | EMBODIMENT 5 | EMBODIMENT 6 | EMBODIMENT 7 | EMBODIMENT 8 |
|---|---|---|---|---|
| FOCAL LENGTH OF NEGATIVE 411ST LENS | −104.87 | −81.71 | — | — |
| FOCAL LENGTH OF POSITIVE 421ST LENS | 177.14 | 134.96 | 134.96 | 241.29 |

TABLE 4

| CONDITIONAL EXPRESSION | | EMBODIMENT 1 L411 | EMBODIMENT 1 L421 | EMBODIMENT 2 L411 | EMBODIMENT 2 L421 | EMBODIMENT 3 L411 | EMBODIMENT 3 L421 | EMBODIMENT 4 L411 | EMBODIMENT 4 L421 |
|---|---|---|---|---|---|---|---|---|---|
| (1) | (1-1) LEFT-HAND SIDE | 0.645 | — | 0.645 | — | 0.656 | — | 0.645 | — |
|  | (1-1) RIGHT-HAND SIDE θgF$_{411}$ | 0.689 | — | 0.689 | — | 0.686 | — | 0.689 | — |
|  | (1-2) LEFT-HAND SIDE | — | 0.645 | — | 0.645 | — | 0.645 | — | 0.656 |
|  | (1-2) RIGHT-HAND SIDE θgF$_{421}$ | — | 0.689 | — | 0.689 | — | 0.689 | — | 0.686 |
| (2) | (2-1) θgF$_{411}$ | 0.689 | — | 0.689 | — | 0.686 | — | 0.689 | — |
|  | (2-2) θgF$_{421}$ | — | 0.689 | — | 0.689 | — | 0.689 | — | 0.686 |
| (3) | H'$_{421}$/H$_{421}$ | — | 0.53 | — | 0.54 | — | 0.39 | — | 0.51 |
| (4) | H'$_{411}$/H$_{411}$ | 0.09 | — | 0.09 | — | 0.19 | — | 0.31 | — |
| (10) | (10-1) LEFT-HAND SIDE | 1.365 | — | 1.365 | — | 1.377 | — | 1.365 | — |
|  | (10-1) RIGHT- | 1.422 | — | 1.422 | — | 1.415 | — | 1.422 | — |

TABLE 4-continued

| | | | | | | | | |
|---|---|---|---|---|---|---|---|---|
| | HAND SIDE θgd$_{411}$ | | | | | | | |
| | (10-2) LEFT-HAND SIDE | — | 1.365 | — | 1.365 | — | 1.365 | — | 1.377 |
| | (10-2) RIGHT-HAND SIDE θgd$_{421}$ | — | 1.422 | — | 1.422 | — | 1.422 | — | 1.415 |
| (11) | (11-1) θgd$_{411}$ | 1.422 | — | 1.422 | — | 1.415 | — | 1.422 | — |
| | (11-2) θgd$_{421}$ | — | 1.422 | — | 1.422 | — | 1.422 | — | 1.415 |

| CONDITIONAL EXPRESSION | | EMBODIMENT 5 | | EMBODIMENT 6 | | EMBODIMENT 7 | | EMBODIMENT 8 | |
|---|---|---|---|---|---|---|---|---|---|
| | | L411 | L421 | L411 | L421 | L411 | L421 | L411 | L421 |
| (1) | (1-1) LEFT-HAND SIDE | 0.656 | — | 0.645 | — | — | — | — | — |
| | (1-1) RIGHT-HAND SIDE θgF$_{411}$ | 0.686 | — | 0.689 | — | — | — | — | — |
| | (1-2) LEFT-HAND SIDE | — | 0.656 | — | 0.656 | — | 0.656 | — | 0.645 |
| | (1-2) RIGHT-HAND SIDE θgF$_{421}$ | — | 0.686 | — | 0.686 | — | 0.686 | — | 0.689 |
| (2) | (2-1) θgF$_{411}$ | 0.686 | — | 0.689 | — | — | — | — | — |
| | (2-2) θgF$_{421}$ | — | 0.686 | — | 0.686 | — | 0.686 | — | 0.689 |
| (3) | H'$_{421}$/H$_{421}$ | — | 0.55 | — | 0.48 | — | 0.52 | — | 0.53 |
| (4) | H'$_{411}$/H$_{411}$ | 0.08 | — | 0.03 | — | — | — | — | — |
| (10) | (10-1) LEFT-HAND SIDE | 1.377 | — | 1.365 | — | — | — | — | — |
| | (10-1) RIGHT-HAND SIDE | 1.415 | — | 1.422 | — | — | — | — | — |
| | (10-2) LEFT-HAND SIDE θgd$_{411}$ | — | 1.377 | — | 1.377 | — | 1.377 | — | 1.365 |
| | (10-2) RIGHT-HAND SIDE θgd$_{421}$ | — | 1.415 | — | 1.415 | — | 1.415 | — | 1.422 |
| (11) | (11-1) θgd$_{411}$ | 1.415 | — | 1.422 | — | — | — | — | — |
| | (11-2) θgd$_{421}$ | — | 1.415 | — | 1.415 | — | 1.415 | — | 1.422 |

TABLE 5

| CONDITIONAL EXPRESSION | EMBODIMENT 1 | EMBODIMENT 2 | EMBODIMENT 3 | EMBODIMENT 4 |
|---|---|---|---|---|
| (5) (5-1)f41/fL411 | 0.43 | 0.45 | 0.60 | 0.39 |
| (5-2)f42/fL421 | 0.30 | 0.27 | 0.34 | 0.36 |
| (6) fL411/fL421 | −0.87 | −0.84 | −0.76 | −0.93 |
| (7) f41/f42 | −1.25 | −1.41 | −1.35 | −1.03 |

| CONDITIONAL EXPRESSION | EMBODIMENT 5 | EMBODIMENT 6 | EMBODIMENT 7 | EMBODIMENT 8 |
|---|---|---|---|---|
| (5) (5-1)f41/fL411 | 0.48 | 0.31 | — | — |
| (5-2)f42/fL421 | 0.25 | 0.36 | 0.36 | 0.19 |
| (6) fL411/fL421 | −0.59 | −0.61 | — | — |
| (7) f41/f42 | −1.13 | −0.53 | −0.53 | −1.49 |

Based on Tables 1 to 5, each embodiment of the present invention satisfies each condition described above, and a lens made of an optical material having the abnormal dispersibility is used at an appropriate position in an optical path at the image plane side with reference to the stop SP to well correct the chromatic aberration of magnification without deteriorating the on-axis chromatic aberration at the wide-angle end. In Numerical embodiments 1 and 5, the negative 411st lens L411 and the positive 421st lens L421 are arranged comparatively away from each other. Such an arrangement can obtain the correction effects of the chromatic aberration of magnification and the on-axis chromatic aberration.

In Numerical embodiment 2, the positive 421st lens L421 is configured to be held between glass materials as a cemented lens constituted by three lenses. If a material having the abnormal dispersibility which is comparatively weak in the environment resistance is used, such a configuration is effective. In Numerical embodiment 3, the negative 411st lens L411 and the positive 421st lens L421 are positioned comparatively close to each other, and the positive 421st lens L421 is arranged at a position corresponding to a value near the lower limit value of Conditional expression (3). Even then, as Conditional expressions (3) and (4) are satisfied, the correction effects of the chromatic aberration of magnification and the on-axis chromatic aberration are obtained. In Numerical embodiment 4, the negative 411st lens L411 is arranged at a position corresponding to a value near the upper limit value of Conditional expression (4). Even then, as Conditional expressions (3) and (4) are satisfied, the correction effects of the chromatic aberration of magnification and the on-axis chromatic aberration are obtained. Numerical embodiments 6 and 7 show examples where a part of the lens unit U41a is replaced with a different optical system U41b by using a switching device. In any cases, the lens unit U41a corresponding to the forty-first to forty-sixth surfaces of Embodiment 4 is removed and the different optical system is inserted into the space. In numerical embodiments 6 and 7, the lens unit U41b corresponding to the forty-first to fifty-first surfaces and the lens unit U41b corresponding to the forty-first to the fifty surfaces are inserted, respectively. Thus, the focal length of the whole system is shifted to the long focal length side.

The forty-first lens unit U41 in each of Embodiments 7 and 8 does not include a lens corresponding to the negative 411st lens L411. Since the forty-second lens unit U42 includes the positive 421st lens L421, the effect corresponding to each of Conditional expressions (1-2), (2-2), (3), (10-2), and (11-2) described above can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

FIG. 26 is a main schematic diagram of an image pickup apparatus (a TV camera system) using the zoom lens of each embodiment as an image pickup optical system. In FIG. 26, reference numeral 101 denotes a zoom lens of any one of Embodiments 1 to 8. Reference numeral 124 denotes a camera. The zoom lens 101 is configured to be removable from the camera 124. Reference numeral 125 denotes an image pickup apparatus which is constituted by attaching the zoom lens 101 to the camera (the image pickup apparatus body) 124. The zoom lens 101 includes a first lens unit F, a magnification varying portion LZ, and an imaging fourth lens unit R. The first lens unit F includes a focus lens unit. The magnification varying portion LZ includes a second lens unit which moves on an optical axis for performing a magnification varying operation and a third lens unit which moves on the optical axis for correcting the image plane displacement caused by the magnification varying operation. Reference symbol SP denotes an aperture stop. A part of the lens unit U41a included in the forty-first lens unit U41 is replaced with another lens unit IE (U41b) by using a switching device.

The lens unit U41a is replaced with the lens unit IE (U41b) as an extender unit to change the focal length range of the whole system of the zoom lens 101 to a longer one. Reference numerals 114 and 115 denote driving mechanisms such as helicoids or cams which drive the first lens unit F and the magnification varying portion LZ in an optical axis direction, respectively. Reference numerals 116 to 118 denote motors (driving devices) which electrically drive the driving mechanisms 114 and 115 and the aperture stop SP, respectively. Reference numerals 119 to 121 are detectors such as encoders, potentiometers, or photo sensors for detecting positions of the first lens unit F and the magnification varying portion LZ on the optical axis and for detecting a stop diameter of the aperture stop SP. In the camera 124, reference numeral 109 denotes a glass block which corresponds to an optical filter or a color separation prism in the camera 124, and reference numeral 110 denotes a solid-state image pickup element (a photoelectric conversion element) such as a CCD sensor or a CMOS sensor which receives light of an object image formed by the zoom lens 101. Reference numerals 111 and 122 are CPUs which control various kinds of drives of the camera 124 and the zoom lens body 101. Thus, the zoom lens of the present invention is applied to the TV camera to realize an image pickup apparatus having a high optical performance.

Hereinafter, Numerical embodiments 1 to 8 corresponding to Embodiments 1 to 8 of the present invention, respectively, will be shown. In each numerical embodiment, reference symbol i denotes an order of a surface from the object side, reference symbol ri denotes a radius of curvature of an i-th surface from the object side, reference symbol di denotes an interval between the i-th surface and an (i+1)th surface from the object side, and reference symbols Ni and νi denote a refractive index and Abbe number, respectively. The final two surfaces are glass blocks such as filters. An aspherical surface shape is represented by the following expressions, where X (X-axis) is an optical axis direction, H (H-axis) is a direction perpendicular to the optical axis direction, a traveling direction of light is positive, R is a paraxial radius of curvature, k is a conic constant, and A4, A6, A8, and A10 are aspherical coefficients.

$$X = \frac{H^2/R}{1 + \sqrt{1 - (1+k)(H/R)^2}} + A4H^4 + A6H^6 + A8H^8 + A10H^{10}$$

For example, the description of "e-Z" means "×10$^{-Z}$". Symbol "*" indicates an aspherical surface.

[Numerical embodiment 1]

Surface data

| Surface number | r | d | nd | νd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |
| 37 (stop) | ∞ | 3.32 | | |
| 38 | −64.394 | 0.31 | 1.63555 | 22.7 |
| 39 | −244.065 | 1.50 | 1.72916 | 54.7 |
| 40 | 28.560 | 4.20 | 1.84666 | 23.8 |
| 41 | 63.574 | 6.04 | | |
| 42 | −34.299 | 1.80 | 1.75500 | 52.3 |
| 43 | 62.469 | 8.89 | 1.75520 | 27.5 |
| 44 | −38.575 | 23.29 | | |
| 45 | −52.454 | 1.80 | 1.75500 | 52.3 |
| 46 | 34.314 | 11.59 | 1.54814 | 45.8 |
| 47 | −33.723 | 0.20 | | |
| 48 | 112.278 | 1.80 | 1.83400 | 37.2 |
| 49 | 27.802 | 9.75 | 1.48749 | 70.2 |
| 50 | −73.147 | 0.20 | | |
| 51 | 76.722 | 8.70 | 1.49700 | 81.5 |
| 52 | −34.565 | 1.80 | 1.80518 | 25.4 |
| 53 | −4665.975 | 0.50 | | |
| 54 | 113.725 | 1.88 | 1.63555 | 22.7 |
| 55 | −882.486 | 7.01 | 1.48749 | 70.2 |
| 56 | −33.978 | 5.00 | | |
| 57 | ∞ | 50.00 | 1.51633 | 64.2 |
| 58 | ∞ | | | |

Aspherical surface data
Twenty-eighth surface

K = 0.00000e+000　　A4 = 2.32112e−007　　A6 = 2.35378e−010
A8 = −2.98860e−013　　A10 = 1.74212e−016

Various kinds of data
Zoom ratio 18.50

| | | | |
|---|---|---|---|
| Focal length | 7.20 | 31.29 | 133.20 |
| F-number | 1.54 | 1.54 | 1.85 |
| Field angle | 74.76 | 19.94 | 4.72 |
| Image height | 5.50 | 5.50 | 5.50 |
| Total lens length | 541.91 | 541.91 | 541.91 |
| BF | 47.93 | 47.93 | 47.93 |
| d17 | 5.08 | 79.08 | 112.22 |
| d26 | 150.47 | 62.77 | 4.53 |
| d36 | 2.15 | 15.84 | 40.95 |

Data of zoom lens unit

| Group | Start surface | Final surface | Focal length |
|---|---|---|---|
| 1 | 1 | 17 | 113.04 |
| 2 | 18 | 26 | −29.50 |
| 3 | 27 | 36 | 49.00 |
| 4 | 38 | 56 | 31.38 |

[Numerical embodiment 2]

Surface data

| Surface number | r | d | nd | νd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |

[Numerical embodiment 2] (continued)

| | | | | |
|---|---|---|---|---|
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |
| 37 (stop) | ∞ | 3.36 | | |
| 38 | −64.576 | 0.32 | 1.63555 | 22.7 |
| 39 | −223.414 | 1.50 | 1.72916 | 54.7 |
| 40 | 31.568 | 4.49 | 1.84666 | 23.8 |
| 41 | 64.277 | 6.41 | | |
| 42 | −35.690 | 1.80 | 1.75500 | 52.3 |
| 43 | 112.214 | 7.49 | 1.84666 | 23.8 |
| 44 | −42.201 | 21.73 | | |
| 45 | −43.390 | 1.80 | 1.75500 | 52.3 |
| 46 | 34.293 | 10.63 | 1.54814 | 45.8 |
| 47 | −30.682 | 0.20 | | |
| 48 | 188.047 | 1.80 | 1.83400 | 37.2 |
| 49 | 26.460 | 9.49 | 1.48749 | 70.2 |
| 50 | −74.237 | 0.20 | | |
| 51 | 85.856 | 8.15 | 1.49700 | 81.5 |
| 52 | −35.566 | 1.86 | 1.63555 | 22.7 |
| 53 | −27.353 | 1.80 | 1.80518 | 25.4 |
| 54 | −107.628 | 0.20 | | |
| 55 | 143.052 | 8.48 | 1.48749 | 70.2 |
| 56 | −33.067 | 5.00 | | |
| 57 | ∞ | 50.00 | 1.51633 | 64.2 |
| 58 | ∞ | | | |

Aspherical surface data
Twenty-eighth surface

K = 0.00000e+000   A4 = 2.32112e−007   A6 = 2.35378e−010
A8 = −2.98860e−013   A10 = 1.74212e−016

Various kinds of data
Zoom ratio 18.50

| | | | |
|---|---|---|---|
| Focal length | 7.20 | 31.29 | 133.20 |
| F-number | 1.54 | 1.54 | 1.85 |
| Field angle | 74.76 | 19.94 | 4.72 |
| Image height | 5.50 | 5.50 | 5.50 |
| Total lens length | 539.03 | 539.03 | 539.03 |
| BF | 47.93 | 47.93 | 47.93 |
| d17 | 5.08 | 79.08 | 112.22 |
| d26 | 150.47 | 62.77 | 4.53 |
| d36 | 2.15 | 15.84 | 40.95 |

Data of zoom lens unit

| Group | Start surface | Start surface | Focal length |
|---|---|---|---|
| 1 | 1 | 17 | 113.04 |
| 2 | 18 | 26 | −29.50 |
| 3 | 27 | 36 | 49.00 |
| 4 | 38 | 56 | 30.86 |

[Numerical embodiment 3]

Surface data

| Surface number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |
| 37 (stop) | ∞ | 4.34 | | |
| 38 | −42.711 | 1.50 | 1.72916 | 54.7 |
| 39 | 24.276 | 5.46 | 1.84666 | 23.8 |
| 40 | 67.550 | 5.54 | | |
| 41 | −46.926 | 1.80 | 1.77250 | 49.6 |
| 42 | 78.381 | 0.30 | 1.69591 | 17.7 |
| 43 | 40.036 | 11.90 | 1.64769 | 33.8 |
| 44 | −30.980 | 20.63 | | |
| 45 | −78.486 | 1.80 | 1.77250 | 49.6 |
| 46 | 30.319 | 1.96 | 1.63555 | 22.7 |
| 47 | 42.736 | 10.10 | 1.54814 | 45.8 |
| 48 | −41.699 | 0.20 | | |
| 49 | 80.681 | 1.80 | 1.88300 | 40.8 |
| 50 | 30.645 | 8.23 | 1.48749 | 70.2 |
| 51 | −316.845 | 0.20 | | |
| 52 | 62.986 | 9.23 | 1.49700 | 81.5 |
| 53 | −36.288 | 1.80 | 1.80518 | 25.4 |
| 54 | −223.163 | 0.50 | | |
| 55 | 165.955 | 7.71 | 1.48749 | 70.2 |
| 56 | −36.324 | 5.00 | | |
| 57 | ∞ | 50.00 | 1.51633 | 64.2 |
| 58 | ∞ | | | |

Aspherical surface data
Twenty-eighth surface

K = 0.00000e+000   A4 = 2.32112e−007   A6 = 2.35378e−010
A8 = −2.98860e−013   A10 = 1.74212e−016

Various kinds of data
Zoom ratio 18.50

| | | | |
|---|---|---|---|
| Focal length | 7.20 | 31.29 | 133.20 |
| F-number | 1.54 | 1.54 | 1.85 |
| Field angle | 74.76 | 19.94 | 4.72 |
| Image height | 5.50 | 5.50 | 5.50 |
| Total lens length | 542.33 | 542.33 | 542.33 |
| BF | 47.93 | 47.93 | 47.93 |
| d17 | 5.08 | 79.08 | 112.22 |
| d26 | 150.47 | 62.77 | 4.53 |
| d36 | 2.15 | 15.84 | 40.95 |

-continued

[Numerical embodiment 3]

Data of zoom lens unit

| Group | Start surface | Final surface | Focal length |
|---|---|---|---|
| 1 | 1 | 17 | 113.04 |
| 2 | 18 | 26 | −29.50 |
| 3 | 27 | 36 | 49.00 |
| 4 | 38 | 56 | 33.59 |

[Numerical embodiment 4]

Surface data

| Surface number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |
| 37 (stop) | ∞ | 3.42 | | |
| 38 | −62.203 | 1.50 | 1.72916 | 54.7 |
| 39 | 31.280 | 4.15 | 1.84666 | 23.8 |
| 40 | 69.539 | 6.14 | | |
| 41 | −33.331 | 1.80 | 1.72916 | 54.7 |
| 42 | 62.980 | 8.95 | 1.72825 | 28.5 |
| 43 | −37.502 | 9.07 | | |
| 44 | −122.843 | 4.04 | 1.63980 | 34.5 |
| 45 | −56.343 | 0.30 | 1.63555 | 22.7 |
| 46 | −185.513 | 10.20 | | |
| 47 | −136.178 | 1.80 | 1.75500 | 52.3 |
| 48 | 31.568 | 11.40 | 1.51742 | 52.4 |
| 49 | −37.747 | 0.20 | | |
| 50 | 106.019 | 1.80 | 1.83400 | 37.2 |
| 51 | 28.947 | 9.43 | 1.48749 | 70.2 |
| 52 | −97.992 | 0.20 | | |
| 53 | 65.396 | 9.02 | 1.49700 | 81.5 |
| 54 | −36.604 | 1.80 | 1.80518 | 25.4 |
| 55 | 320.393 | 0.50 | | |
| 56 | 128.411 | 1.98 | 1.69591 | 17.7 |
| 57 | −364.984 | 6.88 | 1.48749 | 70.2 |
| 58 | −33.582 | 5.00 | | |
| 59 | ∞ | 50.00 | 1.51633 | 64.2 |
| 60 | ∞ | (variable) | | |

Aspherical surface data
Twenty-eighth surface

K = 0.00000e+000  A4 = 2.32112e−007  A6 = 2.35378e−010
A8 = −2.98860e−013  A10 = 1.74212e−016

Various kinds of data
Zoom ratio 18.50

| Focal length | 7.20 | 31.29 | 133.20 |
|---|---|---|---|
| F-number | 1.54 | 1.54 | 1.85 |
| Field angle | 74.76 | 19.94 | 4.72 |
| Image height | 5.50 | 5.50 | 5.50 |
| Total lens length | 541.89 | 541.89 | 541.89 |
| BF | 47.93 | 47.93 | 47.93 |
| d17 | 5.08 | 79.08 | 112.22 |
| d26 | 150.47 | 62.77 | 4.53 |
| d36 | 2.15 | 15.84 | 40.95 |

Data of zoom lens unit

| Group | Start surface | Final surface | Focal length |
|---|---|---|---|
| 1 | 1 | 17 | 113.04 |
| 2 | 18 | 26 | −29.50 |
| 3 | 27 | 36 | 49.00 |
| 4 | 37 | 58 | 33.39 |

[Numerical embodiment 5]

Surface data

| Surface number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |

[Numerical embodiment 5] -continued

| | | | | |
|---|---|---|---|---|
| 37 (stop) | ∞ | 2.76 | | |
| 38 | −90.668 | 1.50 | 1.72916 | 54.7 |
| 39 | 40.523 | 0.30 | 1.69591 | 17.7 |
| 40 | 26.096 | 4.52 | 1.84666 | 23.8 |
| 41 | 60.971 | 5.42 | | |
| 42 | −41.764 | 1.80 | 1.75500 | 52.3 |
| 43 | 39.119 | 9.16 | 1.84666 | 23.8 |
| 44 | −77.547 | 24.88 | | |
| 45 | −50.834 | 1.80 | 1.75500 | 52.3 |
| 46 | 33.589 | 11.36 | 1.51742 | 52.4 |
| 47 | −31.367 | 0.20 | | |
| 48 | 102.206 | 1.80 | 1.83400 | 37.2 |
| 49 | 27.239 | 9.38 | 1.48749 | 70.2 |
| 50 | −84.802 | 0.20 | | |
| 51 | 68.486 | 7.80 | 1.49700 | 81.5 |
| 52 | −44.315 | 0.28 | | |
| 53 | −41.200 | 1.64 | 1.69591 | 17.7 |
| 54 | −31.491 | 1.80 | 1.80518 | 25.4 |
| 55 | −201.945 | 0.20 | | |
| 56 | 141.058 | 8.43 | 1.48749 | 70.2 |
| 57 | −33.561 | 5.00 | | |
| 58 | ∞ | 50.00 | 1.51633 | 64.2 |
| 59 | ∞ | | | |

Aspherical surface data
Twenty-eighth surface

K = 0.00000e+000   A4 = 2.32112e−007   A6 = 2.35378e−010
A8 = −2.98860e−013   A10 = 1.74212e−016

Various kinds of data
Zoom ratio 18.50

| Focal length | 7.20 | 31.29 | 133.20 |
|---|---|---|---|
| F-number | 1.54 | 1.54 | 1.85 |
| Field angle | 74.76 | 19.94 | 4.72 |
| Image height | 5.50 | 5.50 | 5.50 |
| Total lens length | 542.55 | 542.55 | 542.55 |
| BF | 47.93 | 47.93 | 47.93 |
| d17 | 5.08 | 79.08 | 112.22 |
| d26 | 150.47 | 62.77 | 4.53 |
| d36 | 2.15 | 15.84 | 40.95 |

Data of zoom lens unit

| Group | Start surface | Start surface | Focal length |
|---|---|---|---|
| 1 | 1 | 17 | 113.04 |
| 2 | 18 | 26 | −29.50 |
| 3 | 27 | 36 | 49.00 |
| 4 | 38 | 57 | 29.67 |

[Numerical embodiment 6]
Surface data

| Surface number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |
| 37 (stop) | ∞ | 3.42 | | |
| 38 | −62.203 | 1.50 | 1.72916 | 54.7 |
| 39 | 31.280 | 4.15 | 1.84666 | 23.8 |
| 40 | 69.539 | 6.25 | | |
| 41 | −137.024 | 3.40 | 1.64769 | 33.8 |
| 42 | −46.103 | 1.27 | | |
| 43 | 21.503 | 9.57 | 1.49700 | 81.5 |
| 44 | −232.924 | 0.31 | 1.63555 | 22.7 |
| 45 | 67.742 | 1.20 | 1.88300 | 40.8 |
| 46 | 36.890 | 2.98 | | |
| 47 | −88.064 | 2.38 | 1.64769 | 33.8 |
| 48 | −49.609 | 2.22 | | |
| 49 | −154.835 | 0.90 | 1.88300 | 40.8 |
| 50 | 14.723 | 3.90 | 1.80809 | 22.8 |
| 51 | 29.544 | 6.12 | | |
| 52 | −136.178 | 1.80 | 1.75500 | 52.3 |
| 53 | 31.568 | 11.40 | 1.51742 | 52.4 |
| 54 | −37.747 | 0.20 | | |
| 55 | 106.019 | 1.80 | 1.83400 | 37.2 |
| 56 | 28.947 | 9.43 | 1.48749 | 70.2 |
| 57 | −97.992 | 0.20 | | |
| 58 | 65.396 | 9.02 | 1.49700 | 81.5 |
| 59 | −36.604 | 1.80 | 1.80518 | 25.4 |
| 60 | 320.393 | 0.50 | | |
| 61 | 128.411 | 1.98 | 1.69591 | 17.7 |
| 62 | −364.984 | 6.88 | 1.48749 | 70.2 |
| 63 | −33.582 | 5.00 | | |
| 64 | ∞ | 50.00 | 1.51633 | 64.2 |
| 65 | ∞ | | | |

Aspherical surface data
Twenty-eighth surface

K = 0.00000e+000   A4 = 2.32112e−007   A6 = 2.35378e−010
A8 = −2.98860e−013   A10 = 1.74212e−016

Various kinds of data
Zoom ratio 18.50

| Focal length | 14.00 | 60.85 | 259.00 |
|---|---|---|---|
| F-number | 3.08 | 3.08 | 3.60 |
| Field angle | 42.90 | 10.32 | 2.44 |
| Image height | 5.50 | 5.50 | 5.50 |
| Total lens length | 541.89 | 541.89 | 541.89 |
| BF | 47.93 | 47.93 | 47.93 |
| d17 | 5.08 | 79.08 | 112.22 |
| d26 | 150.47 | 62.77 | 4.53 |
| d36 | 2.15 | 15.84 | 40.95 |

Data of zoom lens unit

| Group | Start surface | Start surface | Focal length |
|---|---|---|---|
| 1 | 1 | 17 | 113.04 |
| 2 | 18 | 26 | −29.50 |

-continued

[Numerical embodiment 6]

| 3 | 27 | 36 | 49.00 |
|---|----|----|-------|
| 4 | 38 | 63 | 94.14 |

[Numerical embodiment 7]

Surface data

| Surface number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |
| 35 | 128.221 | 8.81 | 1.62041 | 60.3 |
| 36 | −137.703 | (variable) | | |
| 37(stop) | ∞ | 3.42 | | |
| 38 | −62.203 | 1.50 | 1.72916 | 54.7 |
| 39 | 31.280 | 4.15 | 1.84666 | 23.8 |
| 40 | 69.539 | 2.76 | | |
| 41 | 167.329 | 4.04 | 1.65412 | 39.7 |
| 42 | −63.346 | 2.00 | | |
| 43 | 19.261 | 9.19 | 1.48749 | 70.2 |
| 44 | −441.993 | 1.20 | 1.80518 | 25.4 |
| 45 | 20.286 | 3.91 | | |
| 46 | −45.319 | 2.22 | 1.75520 | 27.5 |
| 47 | −30.474 | 1.06 | | |
| 48 | −67.546 | 0.90 | 1.69680 | 55.5 |
| 49 | 16.303 | 4.35 | 1.80809 | 22.8 |
| 50 | 29.654 | 8.86 | | |
| 51 | −136.178 | 1.80 | 1.75500 | 52.3 |
| 52 | 31.568 | 11.40 | 1.51742 | 52.4 |
| 53 | −37.747 | 0.20 | | |
| 54 | 106.019 | 1.80 | 1.83400 | 37.2 |
| 55 | 28.947 | 9.43 | 1.48749 | 70.2 |
| 56 | −97.992 | 0.20 | | |
| 57 | 65.396 | 9.02 | 1.49700 | 81.5 |
| 58 | −36.604 | 1.80 | 1.80518 | 25.4 |
| 59 | 320.393 | 0.50 | | |
| 60 | 128.411 | 1.98 | 1.69591 | 17.7 |
| 61 | −364.984 | 6.88 | 1.48749 | 70.2 |

-continued

[Numerical embodiment 7]

| 62 | −33.582 | 5.00 | | |
|---|---|---|---|---|
| 63 | ∞ | 50.00 | 1.51633 | 64.2 |
| 64 | ∞ | | | |

Aspherical surface data
Twenty-eighth surface

K = 0.00000e+000   A4 = 2.32112e−007   A6 = 2.35378e−010
A8 = −2.98860e−013   A10 = 1.74212e−016

Various kinds of data
Zoom ratio 18.50

| Focal length | 14.12 | 61.38 | 261.26 |
|---|---|---|---|
| F-number | 3.08 | 3.08 | 3.63 |
| Field angle | 42.56 | 10.24 | 2.42 |
| Image height | 5.50 | 5.50 | 5.50 |
| Total lens length | 541.89 | 541.89 | 541.89 |
| BF | 47.93 | 47.93 | 47.93 |

| | | | | | | |
|---|---|---|---|---|---|---|
| d17 | 5.08 | 57.08 | 79.08 | 95.08 | 112.22 | 109.35 |
| d26 | 150.47 | 91.08 | 62.77 | 38.87 | 4.53 | 11.51 |
| d36 | 2.15 | 9.53 | 15.84 | 23.75 | 40.95 | 36.84 |

Data of zoom lens unit

| Group | Start surface | Focal length |
|---|---|---|
| 1 | 17 | 113.04 |
| 2 | 26 | −29.50 |
| 3 | 36 | 49.00 |
| 4 | 64 | 79.71 |

[Numerical embodiment 8]

Surface data

| Surface number | r | d | nd | vd |
|---|---|---|---|---|
| 1 | 335.346 | 4.70 | 1.77250 | 49.6 |
| 2 | 100.786 | 37.33 | | |
| 3 | −190.279 | 4.50 | 1.77250 | 49.6 |
| 4 | 3222.942 | 0.15 | | |
| 5 | 251.152 | 10.21 | 1.71736 | 29.5 |
| 6 | 1141.804 | 7.82 | | |
| 7 | −1097.861 | 15.33 | 1.49700 | 81.5 |
| 8 | −157.636 | 0.20 | | |
| 9 | 16423.763 | 4.40 | 1.80518 | 25.4 |
| 10 | 240.582 | 13.15 | 1.49700 | 81.5 |
| 11 | −568.448 | 37.36 | | |
| 12 | 564.340 | 17.16 | 1.43387 | 95.1 |
| 13 | −171.752 | 0.15 | | |
| 14 | 195.384 | 12.55 | 1.43387 | 95.1 |
| 15 | −2522.933 | 0.15 | | |
| 16 | 126.181 | 8.98 | 1.61800 | 63.3 |
| 17 | 227.998 | (variable) | | |
| 18 | 84.740 | 1.50 | 1.88300 | 40.8 |
| 19 | 47.202 | 6.00 | | |
| 20 | −175.089 | 1.50 | 1.77250 | 49.6 |
| 21 | 125.630 | 5.65 | | |
| 22 | −52.258 | 1.50 | 1.77250 | 49.6 |
| 23 | 1040.028 | 8.71 | 1.80809 | 22.8 |
| 24 | −38.455 | 0.66 | | |
| 25 | −36.242 | 1.50 | 1.81600 | 46.6 |
| 26 | −249.875 | (variable) | | |
| 27 | −758.136 | 5.45 | 1.61800 | 63.3 |
| 28* | −99.462 | 0.20 | | |
| 29 | 355.782 | 2.50 | 1.72047 | 34.7 |
| 30 | 65.376 | 11.59 | 1.61800 | 63.3 |
| 31 | −144.731 | 0.20 | | |
| 32 | 213.940 | 9.07 | 1.60311 | 60.6 |
| 33 | −87.683 | 2.50 | 1.84666 | 23.9 |
| 34 | −280.740 | 0.20 | | |

-continued

[Numerical embodiment 8]

| | | | | |
|---|---|---|---|---|
| 35 | 128.221 | 8.81 | 1.62041 | 60.3 |
| 36 | −137.703 | (variable) | | |
| 37 (stop) | ∞ | 2.96 | | |
| 38 | −79.835 | 1.50 | 1.61405 | 55.0 |
| 39 | 36.607 | 4.05 | 1.90200 | 25.1 |
| 40 | 55.048 | 7.96 | | |
| 41 | −31.585 | 1.80 | 1.75500 | 52.3 |
| 42 | 49.051 | 10.83 | 1.75520 | 27.5 |
| 43 | −38.289 | 16.88 | | |
| 44 | −39.754 | 1.80 | 1.75500 | 52.3 |
| 45 | 36.678 | 11.13 | 1.54814 | 45.8 |
| 46 | −29.872 | 0.20 | | |
| 47 | 222.287 | 1.80 | 1.83400 | 37.2 |
| 48 | 27.337 | 9.66 | 1.48749 | 70.2 |
| 49 | −64.553 | 0.20 | | |
| 50 | 85.482 | 8.85 | 1.49700 | 81.5 |
| 51 | −31.091 | 1.80 | 1.80518 | 25.4 |
| 52 | −139.095 | 0.50 | | |
| 53 | 149.888 | 1.99 | 1.63555 | 22.7 |
| 54 | 4596.059 | 7.29 | 1.48749 | 70.2 |
| 55 | −33.778 | 5.00 | | |
| 56 | ∞ | 50.00 | 1.51633 | 64.2 |
| 57 | ∞ | (variable) | | |
| Image plane | ∞ | | | |

Aspherical surface data
Twenty-eighth surface

K = 0.00000e+000   A4 = 2.32112e−007   A6 = 2.35378e−010
A8 = −2.98860e−013   A10 = 1.74212e−016

Various kinds of data
Zoom ratio 18.50

| | | | |
|---|---|---|---|
| Focal length | 7.20 | 31.29 | 133.20 |
| F-number | 1.54 | 1.54 | 1.85 |
| Field angle | 37.38 | 9.97 | 2.36 |
| Image height | 5.50 | 5.50 | 5.50 |
| Total lens length | 555.56 | 555.56 | 555.56 |
| BF | 9.99 | 9.99 | 9.99 |
| d17 | 5.08 | 79.08 | 112.22 |
| d26 | 150.47 | 62.77 | 4.53 |
| d36 | 2.15 | 15.84 | 40.95 |

Data of zoom lens unit

| Group | Start surface | Focal length |
|---|---|---|
| 1 | 1 | 113.04 |
| 2 | 18 | −29.50 |
| 3 | 27 | 49.00 |
| 4 | 37 | 31.36 |

This application claims the benefit of Japanese Patent Application No. 2009-127523, filed on May 27, 2009, which is hereby incorporated by reference herein in its entirety.

What is claimed is:

1. A zoom lens comprising:

in order from an object side to an image side, a first lens unit which has a positive refractive power and does not move for a zoom operation, a second lens unit which has a negative refractive power and moves in the zoom operation, a third lens unit which moves in the zoom operation, and a fourth lens unit which has a positive refractive power and does not move for the zoom operation, wherein the fourth lens unit is constituted by a forty-first lens unit which has a negative refractive power and is arranged at the object side with reference to the longest air gap and a forty-second lens unit which has a positive refractive power and is arranged at the image side with reference to the air gap, the forty-first lens unit includes a negative 411st lens,
the forty-second lens unit includes a positive 421st lens, and
the following conditional expressions are satisfied, where $vd_{411}$ and $\theta gF_{411}$ are Abbe number and a partial dispersion ratio of a material of the 411st lens respectively, and $vd_{421}$ and $\theta gF_{421}$ are Abbe number and a partial dispersion ratio of a material of the 421st lens respectively $$-2.100 \times 10^{-3} \times vd_{411} + 0.693 < \theta gF_{411}$$

$$-2.100 \times 10^{-3} \times vd_{421} + 0.693 < \theta gF_{421}$$

$$0.555 < \theta gF_{411} < 0.900$$

$$0.555 < \theta gF_{421} < 0.900.$$

2. A zoom lens according to claim 1,
wherein the following conditional expressions are satisfied, where $\theta gd_{411}$ and $\theta gd_{421}$ are the partial dispersion ratios of the materials of the 411st lens and the 421st lens, respectively $$-2.407 \times 10^{-3} \times vd_{411} + 1.420 < \theta gd_{411}$$

$$-2.407 \times 10^{-3} \times vd_{421} + 1.420 < \theta gd_{421}$$

$$1.255 < \theta gd_{411} < 1.670$$

$$1.255 < \theta gd_{421} < 1.670.$$

3. A zoom lens according to claim 1,
wherein the zoom lens is configured to be removable from an image pickup apparatus body having an image pickup element, and
the 421st lens of the fourth lens unit is arranged at a position satisfying the following conditional expression, where $H_{421}$ is a height from an optical axis of a light beam which passes through the most distant position from the optical axis of an on-axis light beam passing through the 421st lens at a wide-angle end, and $H'_{421}$ is a height from the optical axis of a principal ray of an off-axis light beam having the maximum field angle which passes through the 421st lens $$0.35 < H'_{421}/H_{421}.$$

4. A zoom lens according to claim 1,
wherein the zoom lens is configured to be removable from an image pickup apparatus body having an image pickup element, and
the 411st lens of the fourth lens unit is arranged at a position satisfying the following conditional expression, where $H_{411}$ is a height from an optical axis of a light beam which passes through the most distant position from the optical axis of an on-axis light beam passing through the 411st lens at a wide-angle end, and $H'_{411}$ is a height from the optical axis of a principal ray of an off-axis light beam having the maximum field angle which passes through the 411st lens $$H'_{411}/H_{411} < 0.34.$$

5. A zoom lens according to claim 1,
wherein the following conditional expressions are satisfied, where f41 is a focal length of the forty-first lens unit, f42 is a focal length of the forty-second lens unit, fL411 is a focal length of the 411st lens, and fL421 is a focal length of the 421st lens $$0.25 < f41/fL411 < 0.65$$

$$0.2 < f42/fL421 < 0.4.$$

6. A zoom lens according to claim 1,
wherein the following conditional expression is satisfied, where fL411 is a focal length of the 411st lens and fL421 is a focal length of the 421st lens $-0.95 < fL411/fL421 < -0.55.$ 7. A zoom lens according to claim 1,
wherein the following conditional expression is satisfied, where f41 is a focal length of the forty-first lens unit and f42 is a focal length of the fort-second lens unit $-1.50 < f41/f42 < -0.50.$ 8. A zoom lens comprising:
in order from an object side to an image side, a first lens unit which has a positive refractive power and does not move for a zoom operation, a second lens unit which has a negative refractive power and moves in the zoom operation, a third lens unit which moves in the zoom operation, and a fourth lens unit which has a positive refractive power and an imaging function and does not move for the zoom operation,
wherein the fourth lens unit is constituted by a forty-first lens unit which has a negative refractive power and is arranged at the object side with reference to the longest air gap and a forty-second lens unit which has a positive refractive power and is arranged at the image side with reference to the air gap,
the forty-second lens unit includes a positive 421st lens, and
the following conditional expressions are satisfied, where $vd_{421}$ and $\theta gF_{421}$ are Abbe number and a partial dispersion ratio of a material of the 421st lens respectively $-2.100 \times 10^{-3} \times vd_{421} + 0.693 < \theta gF_{421}$ $0.555 < \theta gF_{421} < 0.900.$ 9. A zoom lens according to claim 8,
wherein the following conditional expressions are satisfied, where $\theta gd_{421}$ is the partial dispersion ratio of the material of the 421st lens $-2.407 \times 10^{-3} \times vd_{421} + 1.420 < \theta gd_{421}$ $1.255 < \theta gd_{421} < 1.670.$ 10. A zoom lens according to claim 8,
wherein the zoom lens is configured to be removable from an image pickup apparatus body having an image pickup element, and
the 421st lens of the fourth lens unit is arranged at a position satisfying the following conditional expression, where $H_{421}$ is a height from an optical axis of a light beam which passes through the most distant position from the optical axis of an on-axis light beam passing through the 421st lens at a wide-angle end, and $H'_{421}$ is a height from the optical axis of a principal ray of an off-axis light beam having the maximum field angle which passes through the 421st lens $0.35 < H'_{421}/H_{421}.$ 11. A zoom lens according to claim 8,
wherein the following condition is satisfied, where f42 is a focal length of the forty-second lens unit and fL421 is a focal length of the 421st lens $0.2 < f42/fL421 < 0.4.$ 12. A zoom lens according to claim 8,
wherein the following conditional expression is satisfied, where f41 is a focal length of the forty-first lens unit and f42 is a focal length of the fort-second lens unit $-1.50 < f41/f42 < -0.50.$ 13. An image pickup apparatus comprising:
a zoom lens; and
a solid-state image pickup element configured to receive light of an image formed by the zoom lens,
wherein the zoom lens comprises, in order from an object side to an image side, a first lens unit which has a positive refractive power and does not move for a zoom operation, a second lens unit which has a negative refractive power and moves in the zoom operation, a third lens unit which moves in the zoom operation, and a fourth lens unit which has a positive refractive power and does not move for the zoom operation,
the fourth lens unit is constituted by a forty-first lens unit which has a negative refractive power and is arranged at the object side with reference to the longest air gap and a forty-second lens unit which has a positive refractive power and is arranged at the image side with reference to the air gap,
the forty-first lens unit includes a negative 411st lens,
the forty-second lens unit includes a positive 421st lens, and
the following conditional expressions are satisfied, where $vd_{411}$ and $\theta gF_{411}$ are Abbe number and a partial dispersion ratio of a material of the 411st lens respectively, and $vd_{421}$ and $\theta gF_{421}$ are Abbe number and a partial dispersion ratio of a material of the 421st lens respectively $-2.100 \times 10^{-3} \times vd_{411} + 0.693 < \theta gF_{411}$ $-2.100 \times 10^{-3} \times vd_{421} + 0.693 < \theta gF_{421}$ $0.555 < \theta gF_{411} < 0.900$ $0.555 < \theta gF_{421} < 0.900.$ 14. An image pickup apparatus comprising:
a zoom lens; and
a solid-state image pickup element configured to receive light of an image formed by the zoom lens,
wherein the zoom lens comprises, in order from an object side to an image side, a first lens unit which has a positive refractive power and does not move for a zoom operation, a second lens unit which has a negative refractive power and moves in the zoom operation, a third lens unit which moves in the zoom operation, and a fourth lens unit which has a positive refractive power and an imaging function and does not move for the zoom operation,
the fourth lens unit is constituted by a forty-first lens unit which has a negative refractive power and is arranged at the object side with reference to the longest air gap and a forty-second lens unit which has a positive refractive power and is arranged at the image side with reference to the air gap,
the forty-second lens unit includes a positive 421st lens, and
the following conditional expressions are satisfied, where $vd_{421}$ and $\theta gF_{421}$ are Abbe number and a partial dispersion ratio of a material of the 421st lens respectively $-2.100 \times 10^{-3} \times vd_{421} + 0.693 < \theta gF_{421}$ $0.555 < \theta gF_{421} < 0.900.$

* * * * *